United States Patent
Mikami et al.

(10) Patent No.: US 10,125,647 B2
(45) Date of Patent: Nov. 13, 2018

(54) EXHAUST GAS PURIFICATION APPARATUS FOR AN INTERNAL COMBUSTION ENGINE

(71) Applicant: TOYOTA JIDOSHA KABUSHIKI KAISHA, Toyota-shi, Aichi (JP)

(72) Inventors: Akira Mikami, Mishima (JP); Shigeki Nakayama, Gotenba (JP); Nobumoto Ohashi, Sunto-gun (JP); Keishi Takada, Ashigarakami-gun (JP); Junichi Matsuo, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 18 days.

(21) Appl. No.: 15/039,462

(22) PCT Filed: Nov. 27, 2014

(86) PCT No.: PCT/JP2014/081451
§ 371 (c)(1),
(2) Date: May 26, 2016

(87) PCT Pub. No.: WO2015/080224
PCT Pub. Date: Jun. 4, 2015

(65) Prior Publication Data
US 2017/0002709 A1 Jan. 5, 2017

(30) Foreign Application Priority Data
Nov. 27, 2013 (JP) .................. 2013-244768

(51) Int. Cl.
*F01N 3/20* (2006.01)
*B01D 53/94* (2006.01)
(Continued)

(52) U.S. Cl.
CPC ......... *F01N 3/208* (2013.01); *B01D 53/9418* (2013.01); *B01D 53/9431* (2013.01);
(Continued)

(58) Field of Classification Search
None
See application file for complete search history.

(56) References Cited

U.S. PATENT DOCUMENTS

| 7,824,636 B1 | 11/2010 | Kraemer et al. |
| 2009/0120068 A1 | 5/2009 | Sakimoto et al. |

(Continued)

FOREIGN PATENT DOCUMENTS

| JP | 2003-293740 | 10/2003 |
| JP | 2003293740 A | * 10/2003 |

(Continued)

OTHER PUBLICATIONS

Saito, S. JP2003293740A—translated document (2003).*

*Primary Examiner* — Walter D. Griffin
*Assistant Examiner* — Jelitza M Perez
(74) *Attorney, Agent, or Firm* — Finnegan, Henderson, Farabow, Garrett & Dunner, LLP

(57) ABSTRACT

An exhaust gas purification apparatus for an internal combustion engine comprises: a selective catalytic reduction (SCR) catalyst selectively reducing NOx in an exhaust gas of the internal combustion engine using ammonia as a reducing agent; a supply device adding an additive agent, such as ammonia, to the exhaust gas at an upstream side of the SCR catalyst; and a controller, when a temperature of SCR catalyst is higher than a predetermined temperature, increases a NOx concentration of the exhaust gas flowing into the SCR catalyst and increases an amount of addition of the additive agent in such a manner that a ratio of an amount of ammonia with respect to an amount of NOx contained in the exhaust gas flowing into the SCR catalyst, becomes large, as compared to when the temperature is equal to or less than the predetermined temperature.

8 Claims, 14 Drawing Sheets

(51) Int. Cl.
    *F01N 9/00*      (2006.01)
    *F01N 11/00*     (2006.01)
    *F01N 13/00*     (2010.01)

(52) U.S. Cl.
    CPC .......... *B01D 53/9495* (2013.01); *F01N 9/00* (2013.01); *F01N 11/002* (2013.01); *F01N 11/007* (2013.01); *F01N 13/008* (2013.01); *F01N 2550/02* (2013.01); *F01N 2560/026* (2013.01); *F01N 2560/06* (2013.01); *F01N 2610/02* (2013.01); *F01N 2900/1402* (2013.01); *F01N 2900/1602* (2013.01); *Y02T 10/24* (2013.01); *Y02T 10/47* (2013.01)

(56) References Cited

U.S. PATENT DOCUMENTS

2010/0247409 A1    9/2010    Collier et al.
2011/0047994 A1    3/2011    Kato
2011/0263417 A1   10/2011    Collier et al.
2012/0141347 A1    6/2012    Collier et al.

FOREIGN PATENT DOCUMENTS

| | | |
|---|---|---|
| JP | 2006-200473 | 8/2006 |
| JP | 2009-138737 | 6/2009 |
| JP | 2009-270449 | 11/2009 |
| JP | 2009-293605 | 12/2009 |
| JP | 2010-53702 | 3/2010 |
| JP | 2010-90852 | 4/2010 |
| JP | 2010-261331 | 11/2010 |
| JP | 2010-261423 | 11/2010 |
| JP | 2011-27102 | 2/2011 |
| JP | 2011-52611 | 3/2011 |
| JP | 2012-152743 | 8/2012 |
| JP | 2012-154238 | 8/2012 |
| JP | 2013-36345 | 2/2013 |
| JP | 2013-92075 | 5/2013 |

* cited by examiner

[FIG. 1]
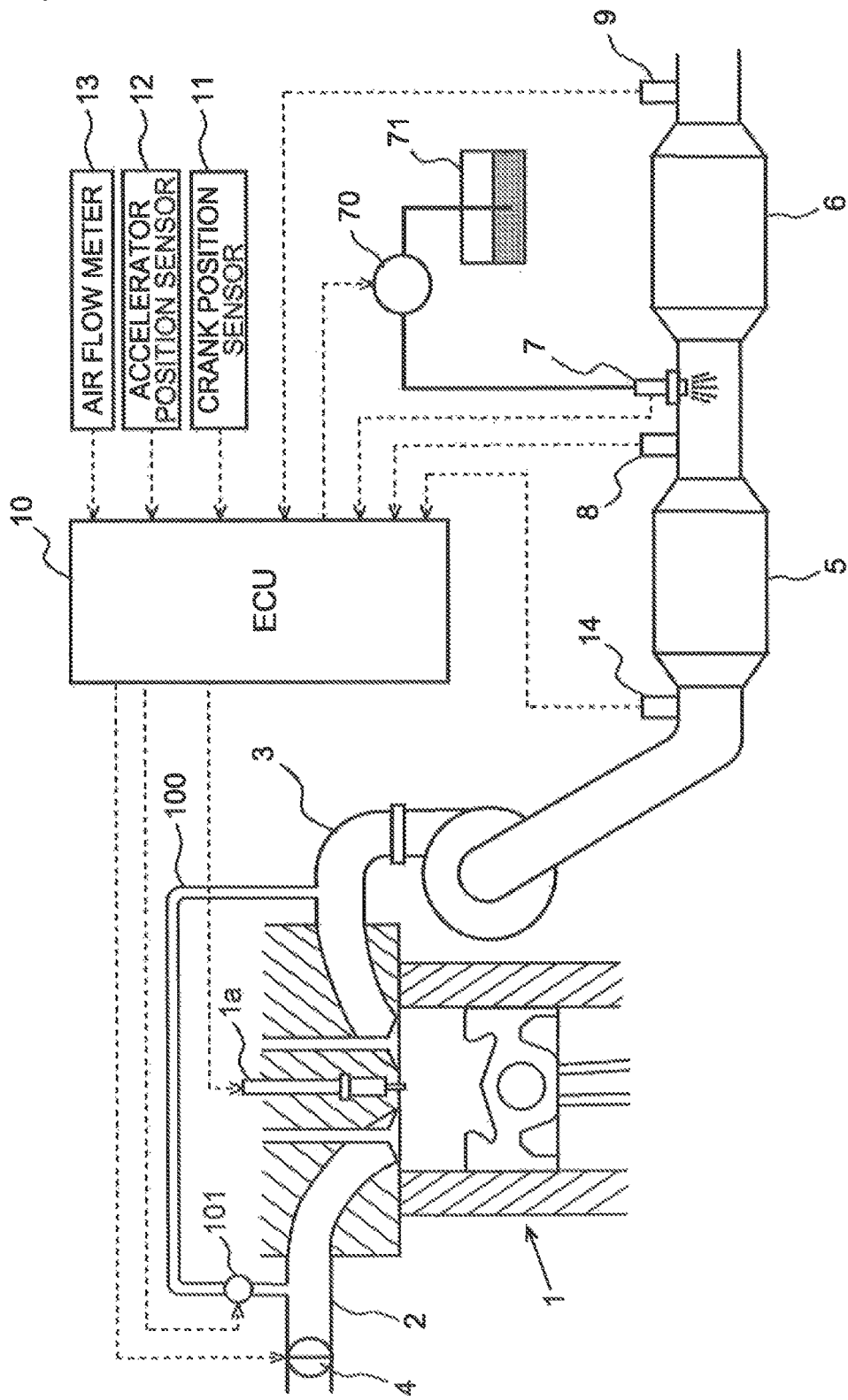

[FIG. 2]
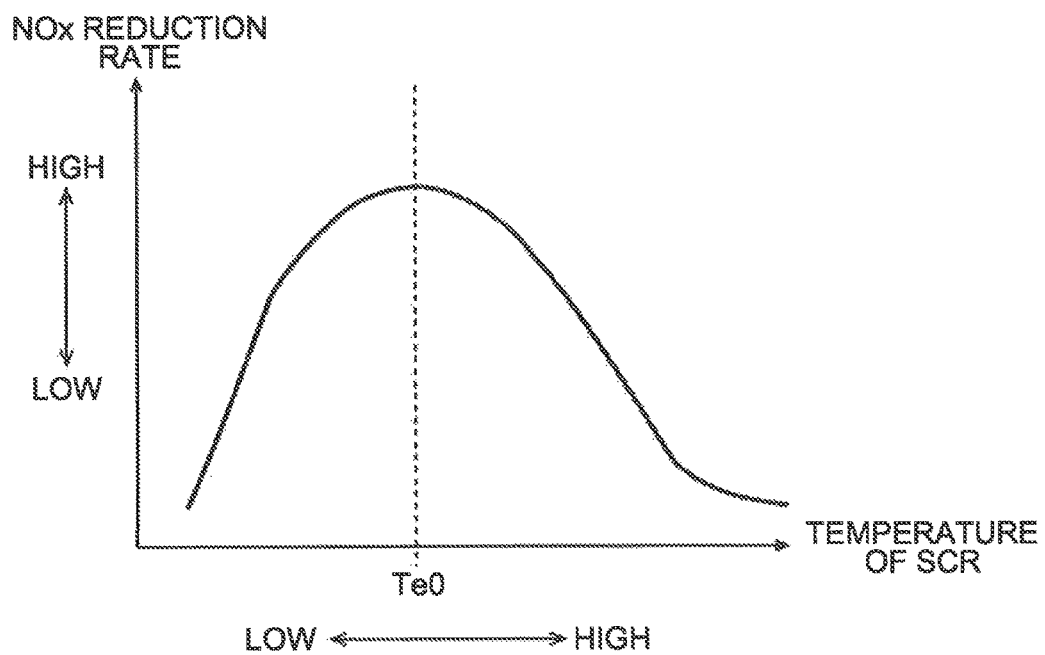
[FIG. 3]
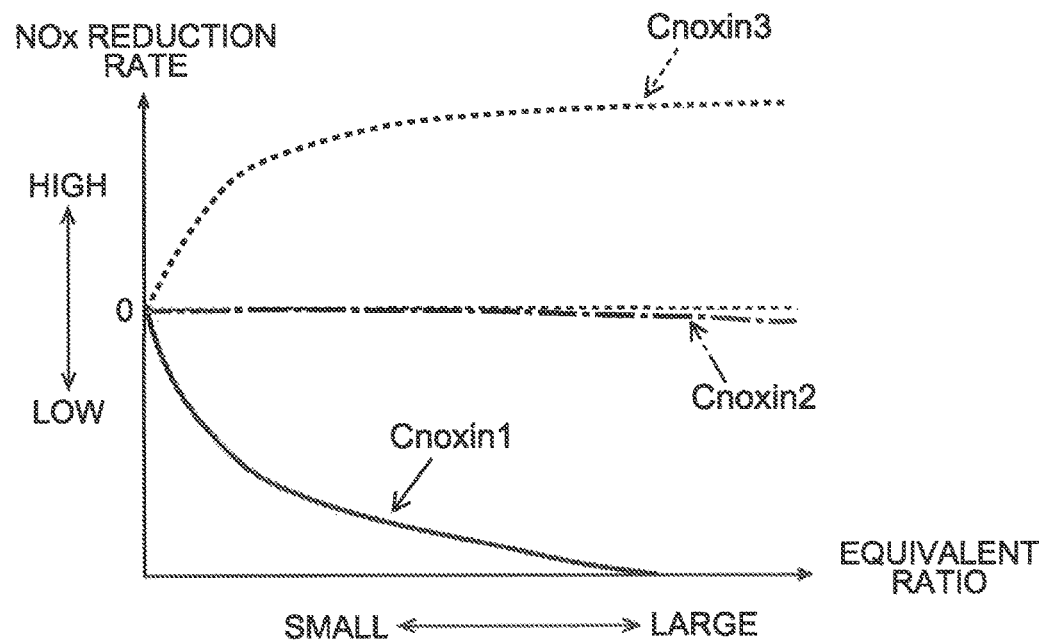

[FIG. 4]
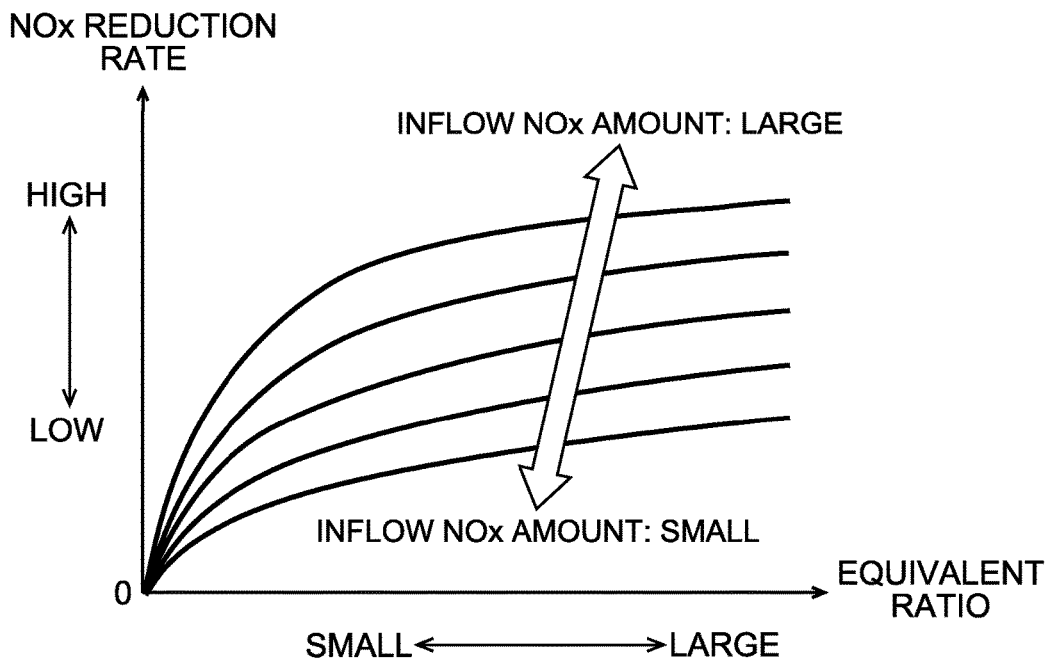
[FIG. 5]
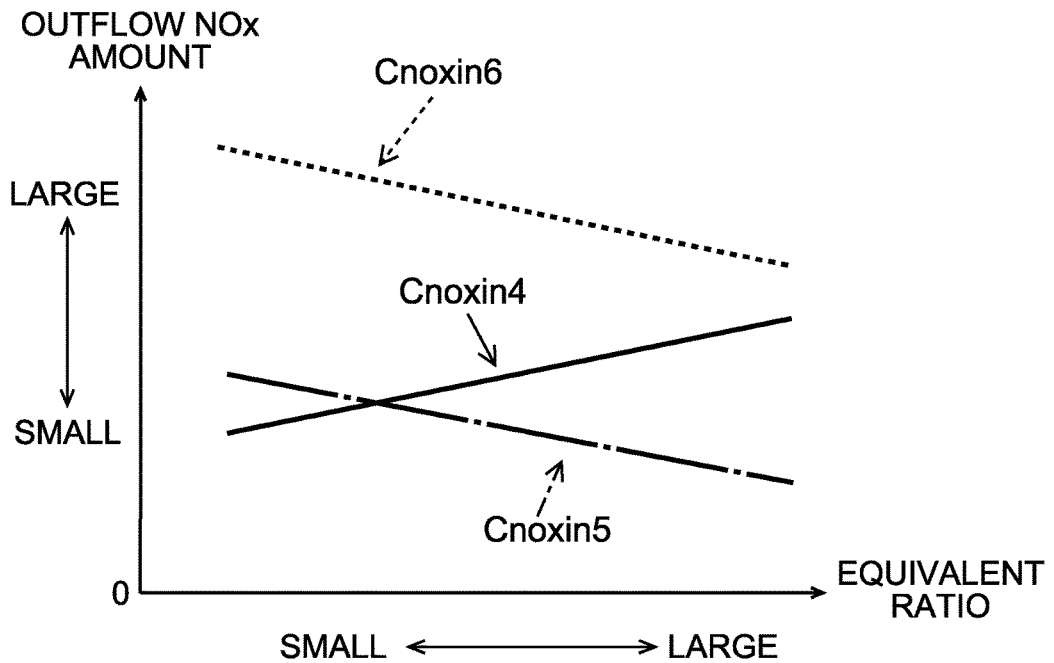

[FIG. 6]
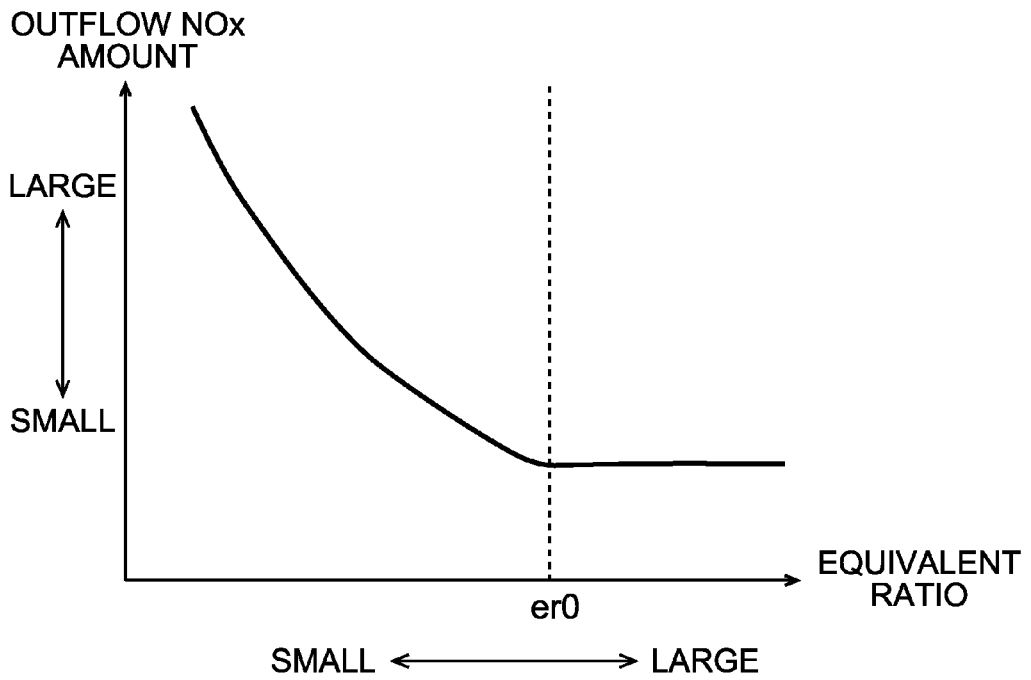
[FIG. 7]
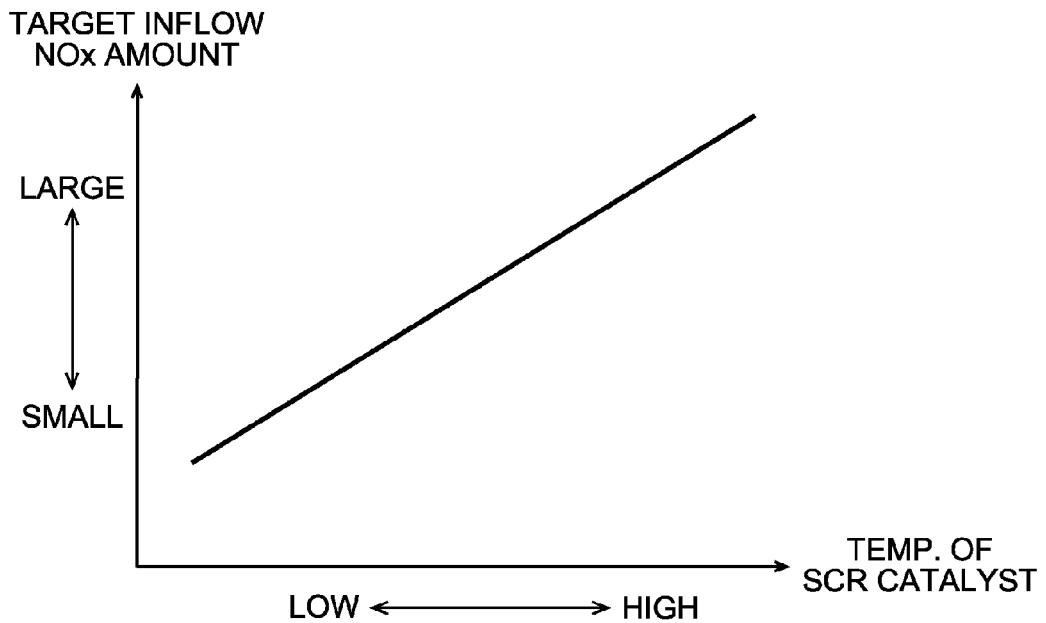

[FIG. 8]
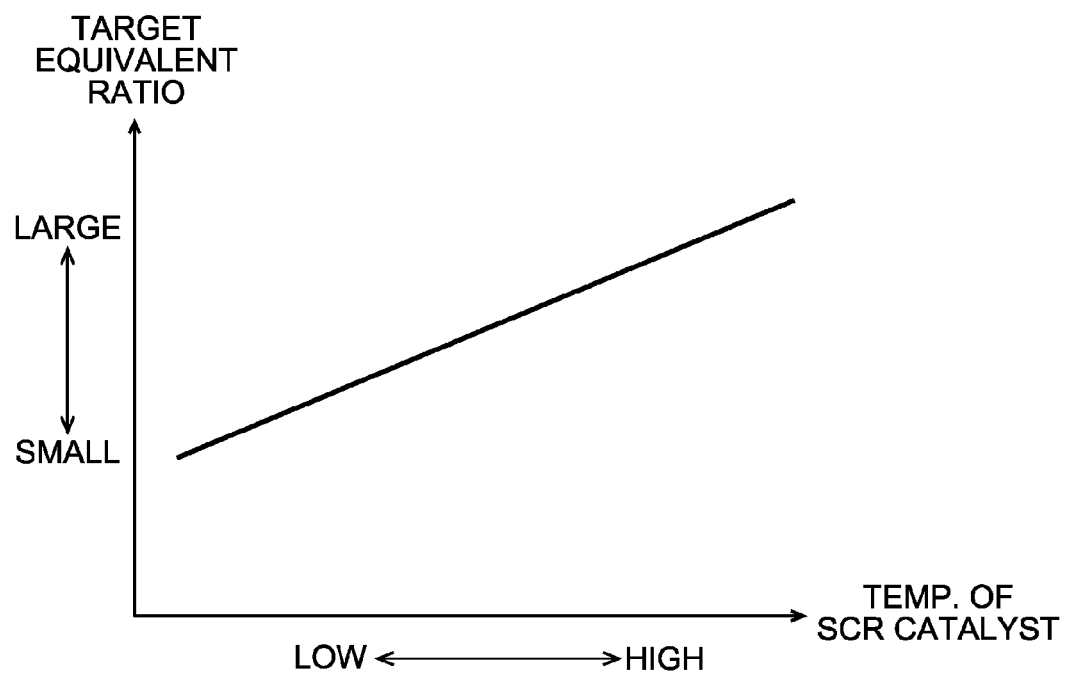

[FIG. 9]
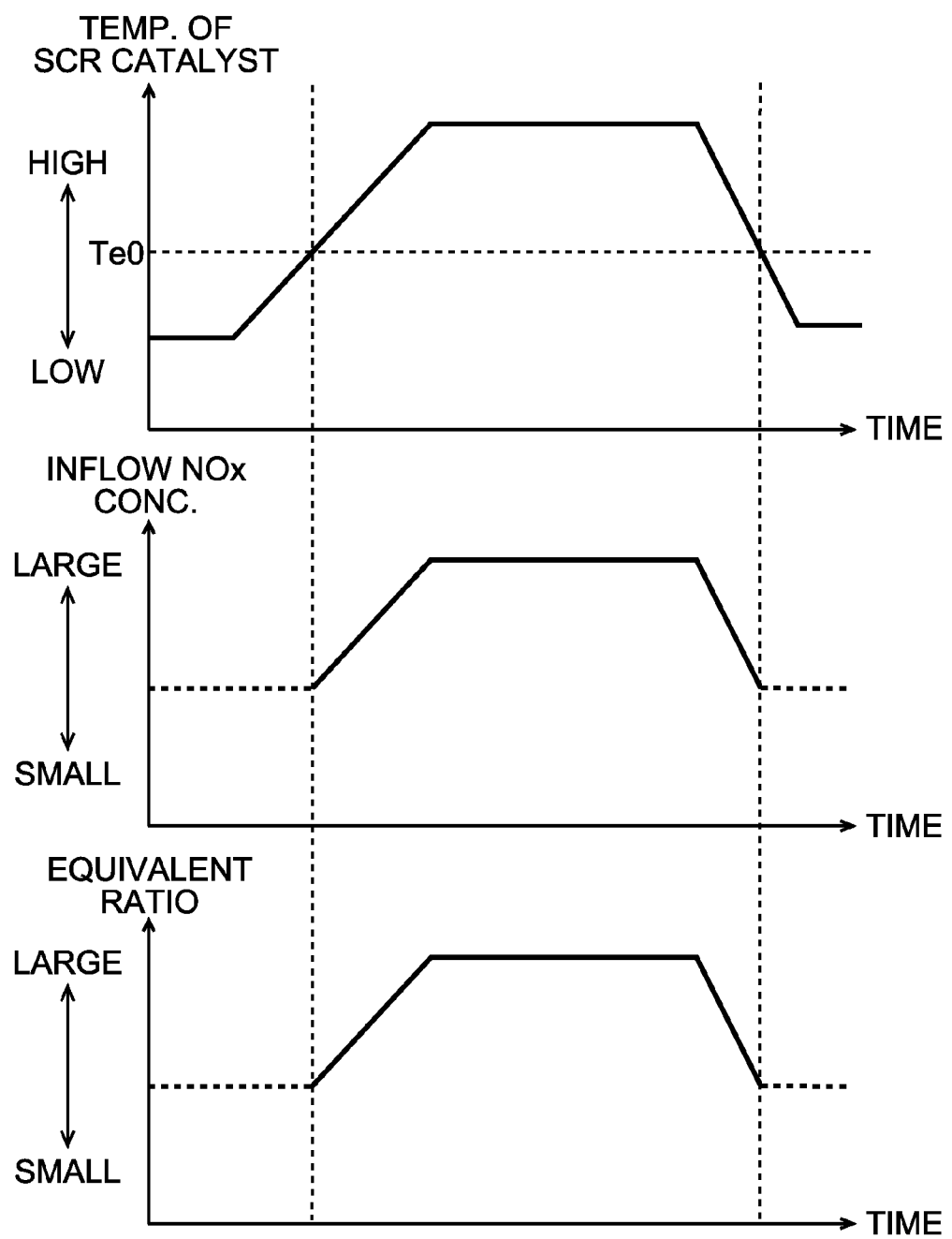

[FIG. 10]
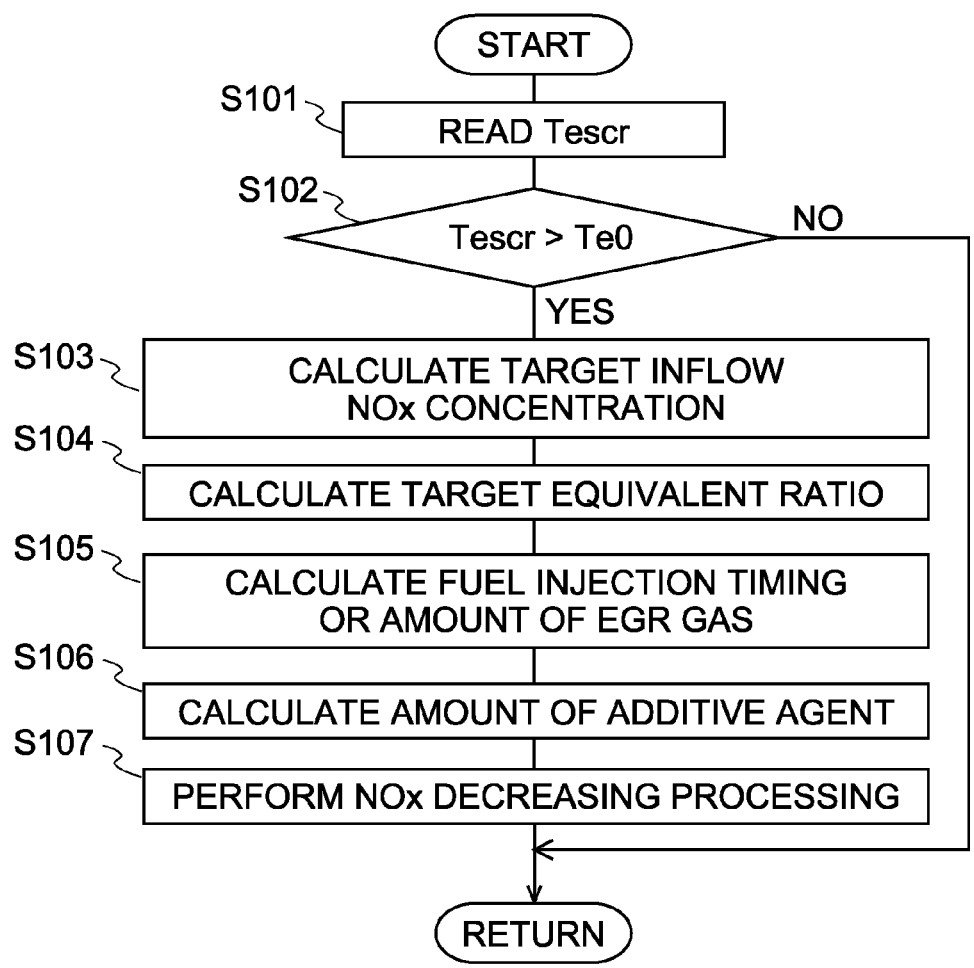

[FIG. 11]
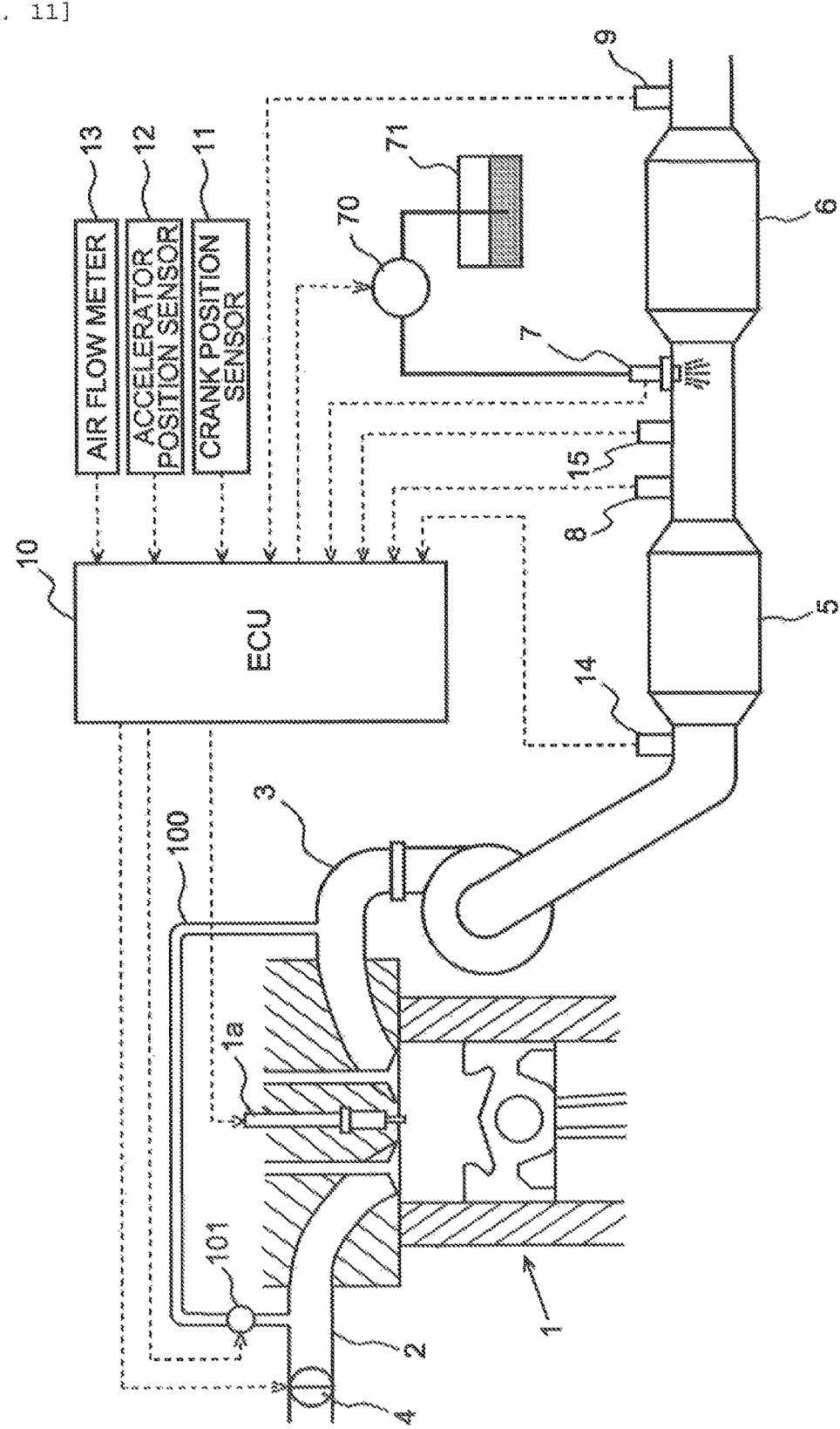

[FIG. 12]
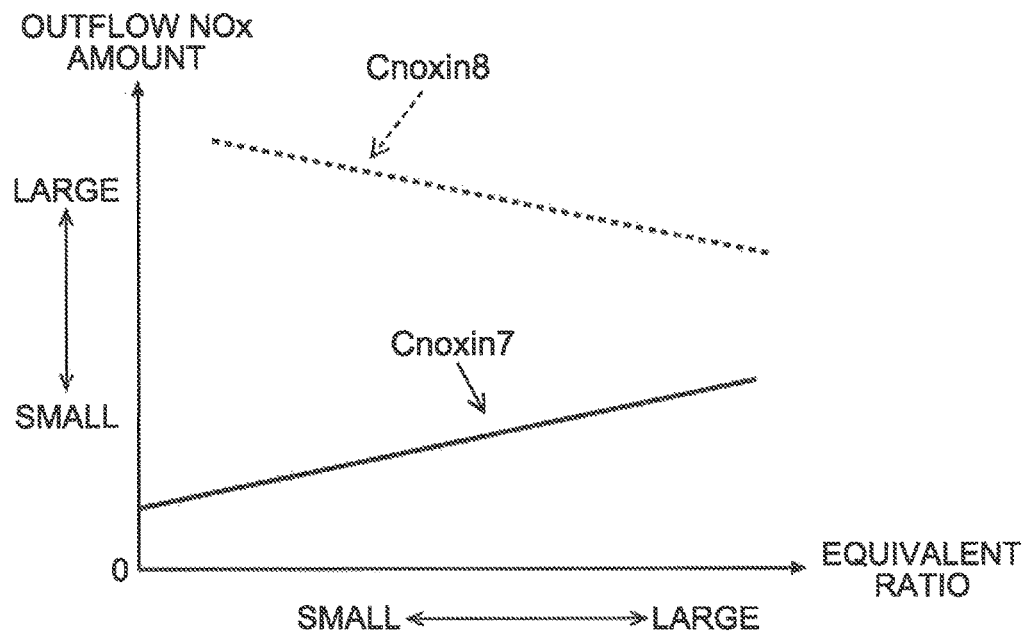
[FIG. 13]
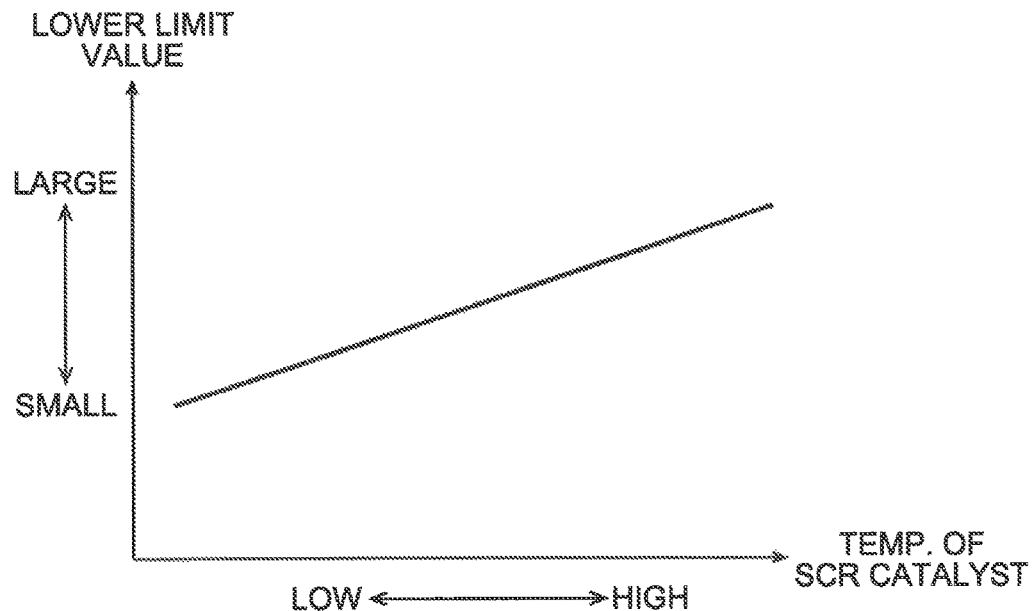

[FIG. 14]
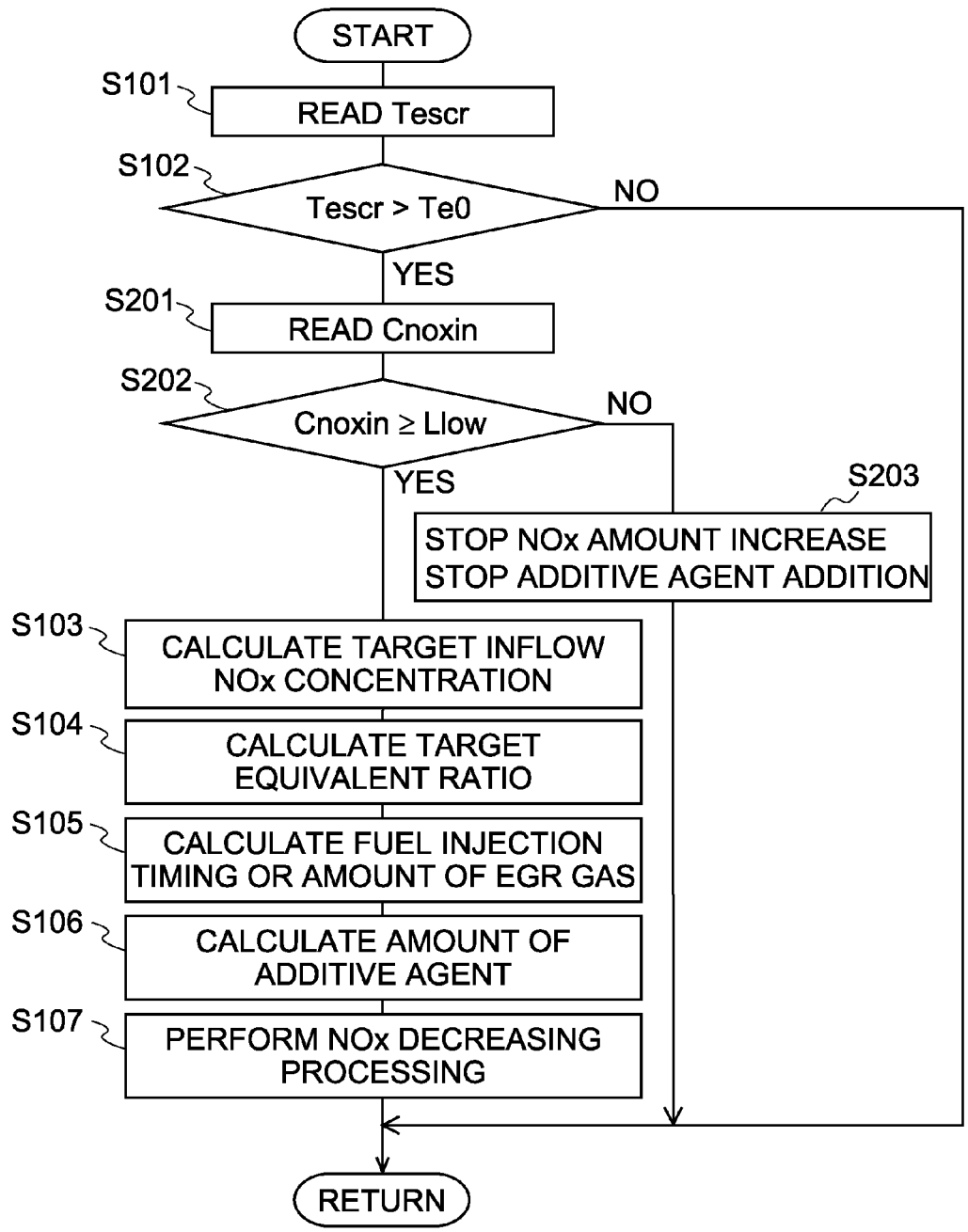

[FIG. 15]
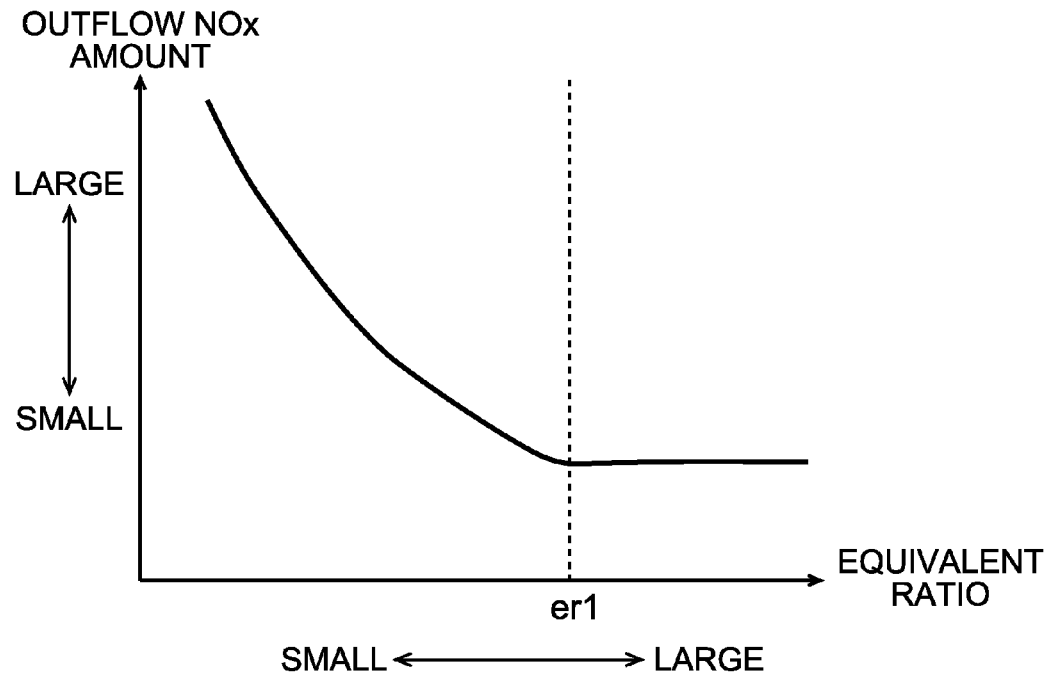
[FIG. 16]
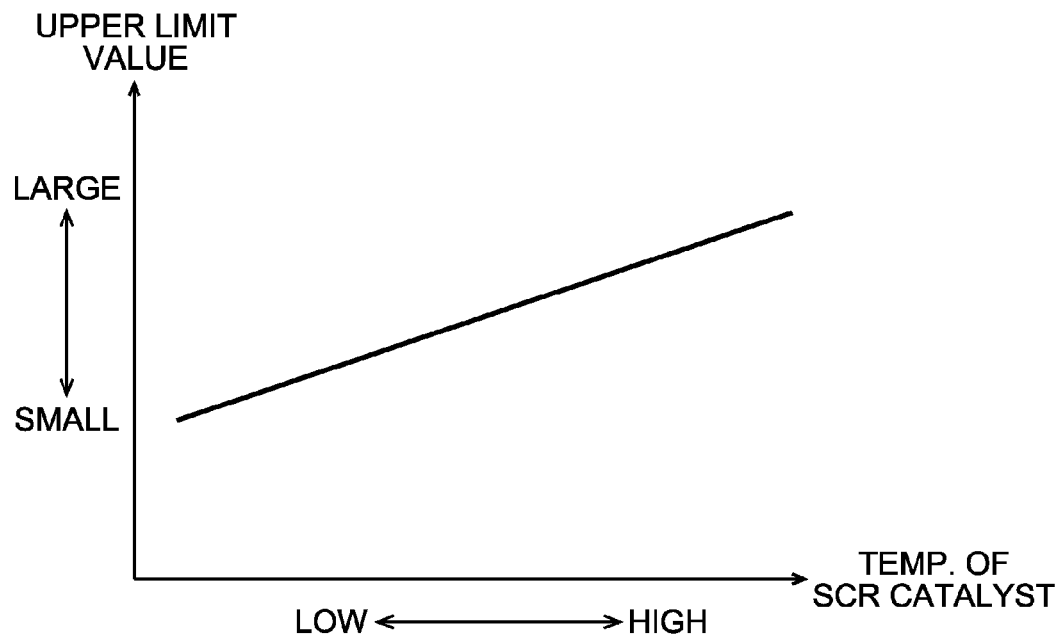

[FIG. 17]
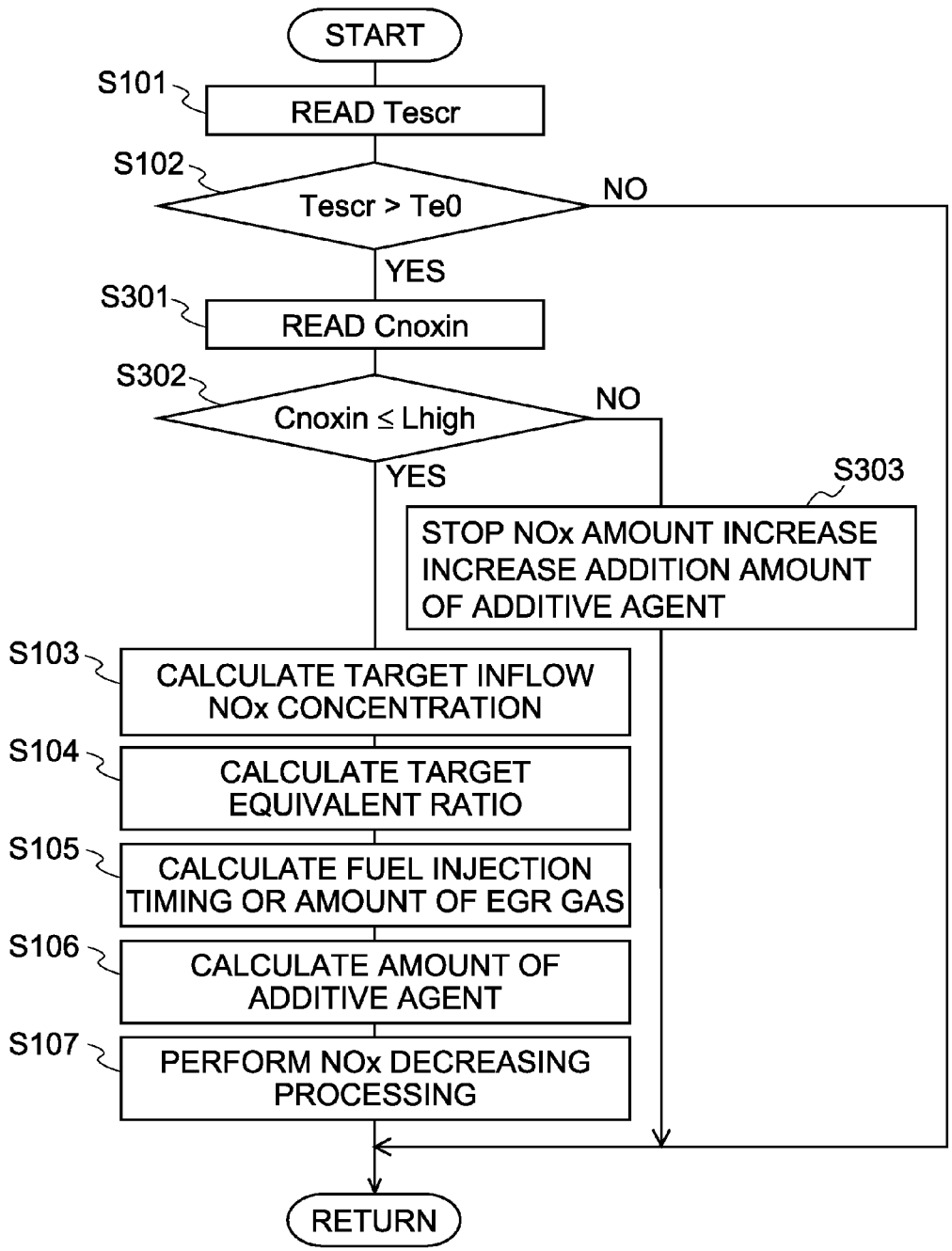

[FIG. 18]
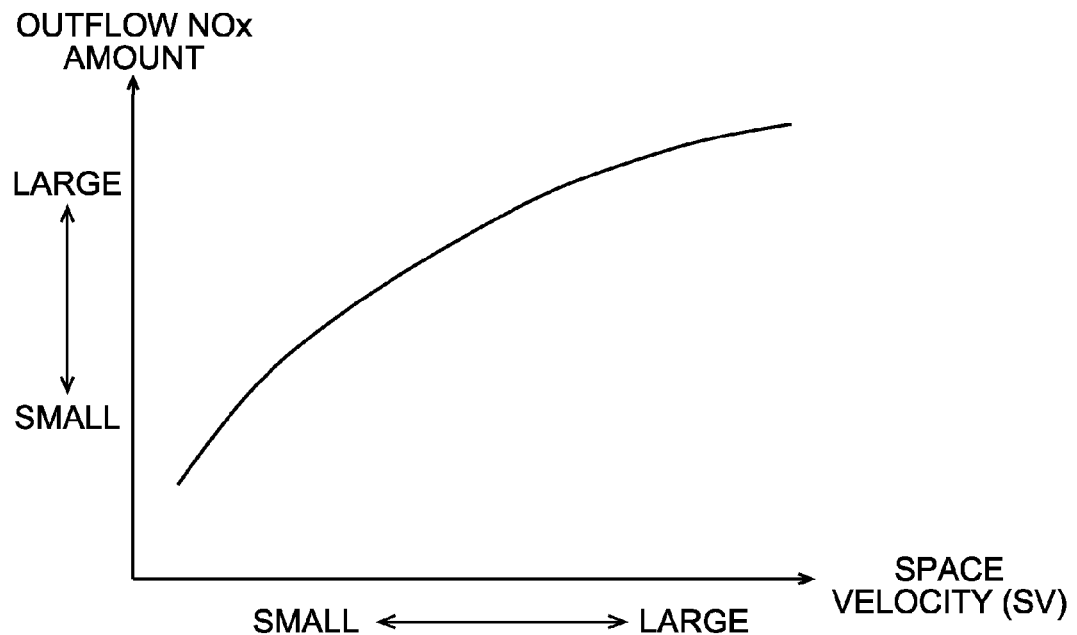
[FIG. 19]
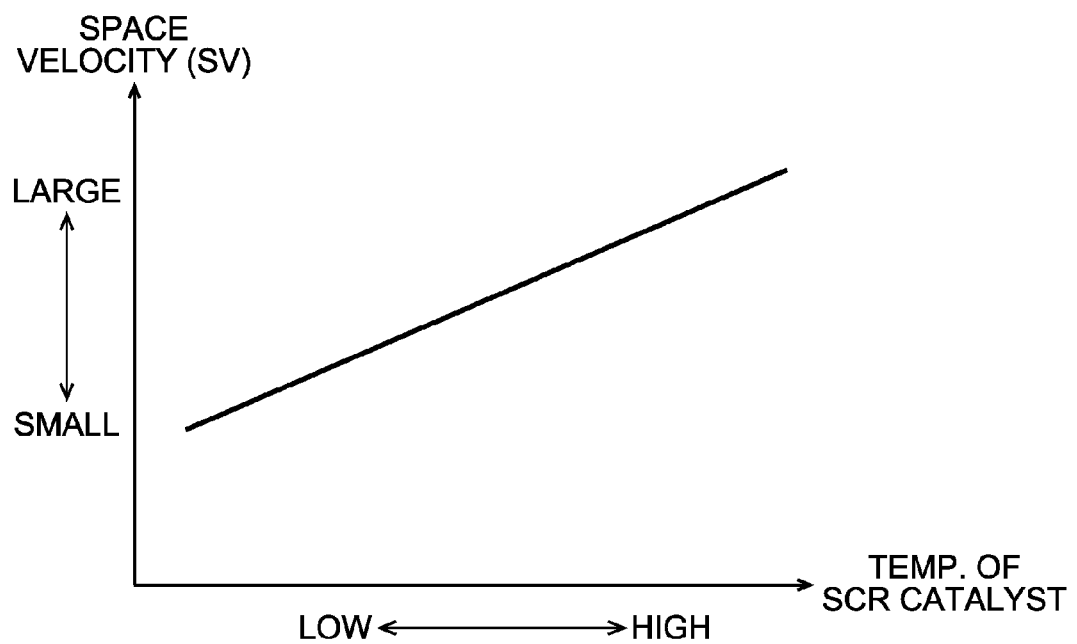

[FIG. 20]
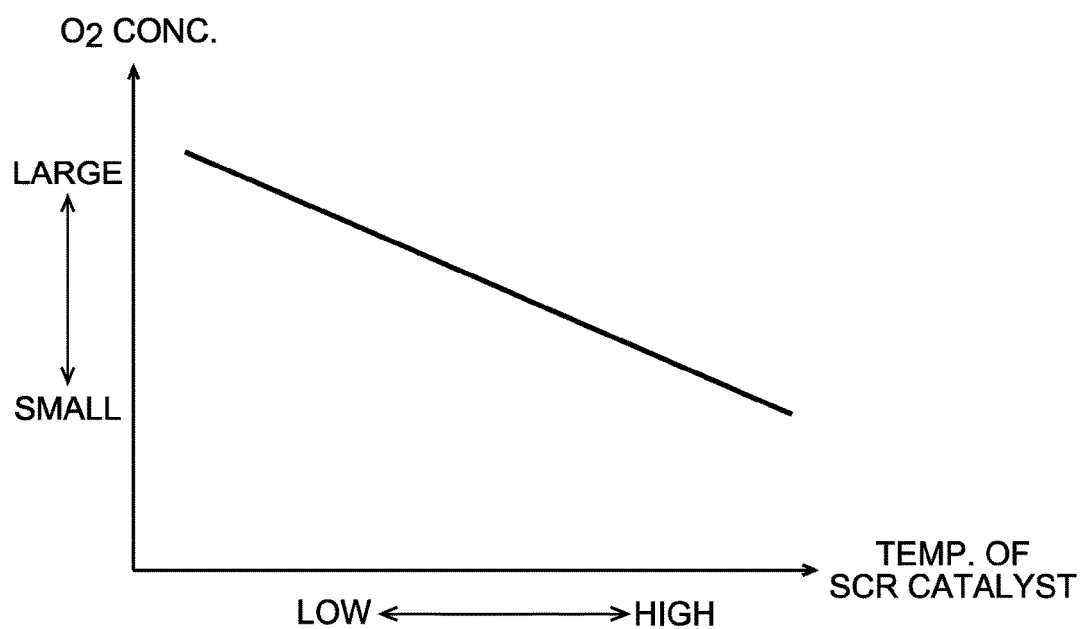

EXHAUST GAS PURIFICATION APPARATUS FOR AN INTERNAL COMBUSTION ENGINE

CROSS-REFERENCE TO RELATED APPLICATIONS

This application is a national phase application of International Application No. PCT/JP2014/081451, filed Nov. 27, 2014, and claims the priority of Japanese Application No. 2013-244768, filed Nov. 27, 2013, the content of both of which is incorporated herein by reference.

TECHNICAL FIELD

The present invention relates to an exhaust gas purification apparatus for an internal combustion engine, and in particular to an exhaust gas purification apparatus for an internal combustion engine which is provided with a selective catalytic reduction catalyst, and a supply device for supplying a reducing agent to the selective catalytic reduction catalyst.

BACKGROUND ART

It is known that in an exhaust gas purification apparatus for an internal combustion engine which is provided with a selective catalytic reduction catalyst (SCR (Selective Catalytic Reduction) catalyst) arranged in an exhaust passage of the internal combustion engine, and a supply device for supplying an additive agent (e.g., urea aqueous solution), which is ammonia ($NH_3$) or a precursor of ammonia, to the exhaust passage at the upstream side of the SCR catalyst, when the thermal deterioration of the SCR catalyst progresses, ammonia will be oxidized by the SCR catalyst, so that NOx will be produced (see, for example, Patent Literature 1).

CITATION LIST

Patent Literature

[Patent Literature 1] Japanese patent laid-open publication No. 2013-036345
[Patent Literature 2] Japanese patent laid-open publication No. 2009-138737
[Patent Literature 3] Japanese patent laid-open publication No. 2010-261423
[Patent Literature 4] Japanese patent laid-open publication No. 2013-092075
[Patent Literature 5] Japanese patent laid-open publication No. 2012-154238
[Patent Literature 6] Japanese patent laid-open publication No. 2011-052611
[Patent Literature 7] Japanese patent laid-open publication No. 2010-261331
[Patent Literature 8] Japanese patent laid-open publication No. 2010-090852
[Patent Literature 9] Japanese patent laid-open publication No. 2010-053702
[Patent Literature 10] Japanese patent laid-open publication No. 2009-270449
[Patent Literature 11] Japanese patent laid-open publication No. 2011-027102

SUMMARY OF THE INVENTION

Technical Problem

However, even in cases where the SCR catalyst has not been thermally deteriorated, when the SCR catalyst is exposed to a high temperature atmosphere, it will become easy for the oxidation reaction of ammonia in the SCR catalyst to occur. In such a case, the NOx reduction performance of the SCR catalyst decreases.

To cope with this, there can be considered a method in which when the SCR catalyst is exposed to a high temperature atmosphere, as described in a second patent literature, the amount of ammonia to be supplied to the SCR catalyst is made to increase. However, when the amount of ammonia to be supplied to the SCR catalyst is increased at the time of the oxidation reaction of ammonia being easy to occur, ammonia ($NH_3$) in the exhaust gas to react with oxygen ($O_2$) will increase, thus giving rise to a possibility that it may become difficult to carry out the efficient reduction or reduction of NOx by the SCR catalyst. As a result, the amount of NOx flowing out from the SCR catalyst may increase on the contrary.

Further, in Patent Literature 3, there is proposed a method in which when the SCR catalyst is exposed to a high temperature atmosphere, the supply of ammonia is stopped. In that case, the oxidation reaction of ammonia is suppressed, but the amount of ammonia contributing to the reduction of NOx becomes smaller, so that NOx having flowed into the SCR catalyst may hardly be reduced. For that reason, the amount of NOx flowing out from the SCR catalyst may increase.

The present invention has been made in view of the actual circumstances as referred to above, and the main object of the invention is that in an exhaust gas purification apparatus for an internal combustion engine which is provided with an SCR catalyst arranged in an exhaust passage of the internal combustion engine, and a supply device for supplying an additive agent which is ammonia or a precursor of ammonia to the SCR catalyst, an increase in the amount of NOx flowing out from the SCR catalyst is suppressed to be small, in cases where the SCR catalyst is exposed to a high temperature atmosphere.

Solution to Problem

In order to solve the above-mentioned problems, the present invention resides in an exhaust gas purification apparatus for an internal combustion engine which is provided with a selective catalytic reduction catalyst (SCR catalyst) arranged in an exhaust passage of the internal combustion engine, and a supply device for supplying an additive agent, which is ammonia or a precursor of ammonia, to the SCR catalyst, wherein a concentration of NOx in the exhaust gas flowing into the SCR catalyst and an amount of additive agent to be supplied to the SCR catalyst are increased when the temperature of the SCR catalyst is equal to or higher than a predetermined temperature as compared to when it is less than the predetermined temperature.

Specifically, an exhaust gas purification apparatus for an internal combustion engine of the present invention comprises:

a selective catalytic reduction catalyst that is arranged in an exhaust passage of the internal combustion engine, and selectively reduces NOx in an exhaust gas by using ammonia as a reducing agent;

a supply device that adds an additive agent, which is ammonia or a precursor of ammonia, to the exhaust gas at an upstream side of the selective catalytic reduction catalyst;

a temperature detection means for detecting a temperature of the selective catalytic reduction catalyst; and a control means for, when the temperature detected by the temperature detection means is higher than the predetermined temperature, increasing an inflow NOx concentration which is a NOx concentration of the exhaust gas flowing into the selective catalytic reduction catalyst and increasing an amount of addition of the additive agent in such a manner that an equivalent ratio, which is a ratio of an amount of ammonia with respect to an amount of NOx flowing into the selective catalytic reduction catalyst, becomes large, as compared to when it is equal to or less than the predetermined temperature.

The "predetermined temperature" referred to herein is a temperature at which it is considered that when the temperature of the SCR catalyst exceeds the predetermined temperature, an amount of NOx flowing out from the SCR catalyst (an outflow NOx amount) exceeds an allowable amount. Here, note that the "allowable amount" is an amount which is appropriately decided based on related laws and regulations, etc.

Ammonia ($NH_3$) can react with NOx and oxygen ($O_2$) in the SCR catalyst. In cases where ammonia reacts with NOx, the following chemical reaction equations (1) through (3) are established. In addition, in the case where ammonia reacts with oxygen, the following chemical reaction equation (4) is established.

$$4NO + 4NH_3 + O_2 \rightarrow 4N_2 + 6H_2O \quad (1)$$

$$NO + NO_2 + 2NH_3 \rightarrow 2N_2 + 3H_2O \quad (2)$$

$$6NO_2 + 8NH_3 \rightarrow 7N_2 + 12H_2O \quad (3)$$

$$NH_3 + O_2 \rightarrow NOx + H_2O \quad (4)$$

Here, in cases where the temperature of the SCR catalyst is equal to or less than the predetermined temperature, it is considered that the reactions (hereinafter, referred to as "first reactions") shown in the above-mentioned chemical reaction equations (1) through (3) become dominant. For that reason, the amount of ammonia, which contacts (reacts with) NOx in the exhaust gas, becomes larger, and at the same time, the amount of ammonia, which contacts (reacts with) oxygen in the exhaust gas, becomes smaller. As a result, the NOx reduction rate of the SCR catalyst becomes higher, and the outflow NOx amount becomes smaller.

On the other hand, in cases where the temperature of the SCR catalyst is higher than the predetermined temperature, it is considered that the reaction shown in the above-mentioned chemical reaction equation (4) (hereinafter, referred to as a "second reaction") becomes dominant. For that reason, the amount of ammonia, which contacts (reacts with) NOx in the exhaust gas, becomes smaller, and at the same time, the amount of ammonia, which contacts (reacts with) oxygen in the exhaust gas, becomes larger. As a result, the NOx reduction rate of the SCR catalyst becomes lower, and the outflow NOx amount becomes larger.

When the NOx concentration of the exhaust gas flowing into the SCR catalyst (the inflow NOx concentration) is increased in situations where the temperature of the SCR catalyst is higher than the predetermined temperature, the ratio or proportion of NOx in the exhaust gas will become higher, so that the amount of ammonia in contact with oxygen decreases, and at the same time, the amount of ammonia in contact with NOx increases. As a result, the above-mentioned second reaction is suppressed, and the amount of ammonia to be converted into NOx decreases. In other words, an increase in the outflow NOx amount (the amount of NOx flowing out from the SCR catalyst) resulting from the oxidation of ammonia can be suppressed to be small.

By the way, an equivalent ratio which is a ratio of an amount of ammonia to be supplied to the SCR catalyst with respect to an amount of NOx flowing into the SCR catalyst (an inflow amount of NOx), (hereinafter, also referred to simply as an "equivalent ratio"), becomes smaller when the inflow NOx concentration is increased as compared to when it is not increased. For that reason, the amount of NOx flowing out from the SCR catalyst without contacting (reacting with) ammonia may become larger.

Accordingly, the exhaust gas purification apparatus for an internal combustion engine of the present invention increases the amount of ammonia supplied to the SCR catalyst, in addition to the inflow NOx concentration, when the temperature of the SCR catalyst is higher than the predetermined temperature, as compared to when it is lower than the predetermined temperature. Specifically, in the control means of the present invention, not only the inflow NOx concentration is increased, but also the amount of the additive agent is increased so as to make larger the equivalent ratio of the amount of ammonia with respect to the inflow amount of NOx, when the temperature of the SCR catalyst is higher than the predetermined temperature, than when it is equal to or less than the predetermined temperature.

When the inflow NOx concentration and the amount of addition of the additive agent are increased in this manner, the equivalent ratio after the inflow NOx concentration and the additive agent are increased becomes larger than that before the inflow NOx concentration and the additive agent are increased. As a result, an amount of ammonia in contact with an increased inflow amount of NOx accompanying an increase in the inflow NOx concentration increases, so that an increase in the outflow NOx amount resulting from the increase in the inflow amount of NOx can be suppressed to be small. In addition, when the equivalent ratio after the inflow NOx concentration and the additive agent are increased is made larger than 1, it can also be expected that the NOx produced by the above-mentioned second reaction in addition to the amount of increase in the inflow amount of NOx is reduced. Accordingly, the amount of the additive agent may be increased in such a manner that the equivalent ratio after the inflow NOx concentration and the additive agent are increased becomes larger than 1.

Accordingly, according to the exhaust gas purification apparatus for an internal combustion engine of the present invention, it is possible to decrease the amount of NOx which does not react with ammonia, while suppressing the amount of ammonia reacting with oxygen to be small. In other words, it is possible to increase the amount of NOx which is removed or reduced by the above-mentioned first reactions, while suppressing the amount of NOx produced by the above-mentioned second reaction to be small. Accordingly, in cases where the SCR catalyst is exposed to a high temperature atmosphere, the NOx reduction rate of the SCR catalyst can be made high, so that the increase in the amount of NOx flowing out from the SCR catalyst can be suppressed to be small.

Here, note that in the exhaust gas purification apparatus for an internal combustion engine according to the present invention, as a method of increasing the inflow NOx concentration, there can be used a method of advancing the fuel injection timing of a compression ignition type internal combustion engine, a method of advancing the ignition timing of a spark ignition internal combustion engine, a method of decreasing the amount of EGR gas in an internal combustion engine having an EGR device, and so on. According to such methods, it also becomes possible to suppress the amount of fuel consumption in the internal combustion engines to be small, while increasing the inflow NOx concentration.

Then, in the case where the temperature detected by the temperature detection means is higher than the predetermined temperature, the control means of the present invention may also make the inflow NOx concentration larger, and the amount of addition of the additive agent larger, as the temperature detected by the temperature detection means becomes higher.

In the case where the temperature of the SCR catalyst is higher than the predetermined temperature, the higher the catalyst temperature of the SCR catalyst becomes, the more remarkable the above-mentioned second reaction (i.e., the reaction of ammonia and oxygen) becomes. Here, the SCR catalyst contains a substance (e.g., a metal such as iron (Fe), copper (Cu), etc.) for oxidizing nitrogen monoxide (NO) in the exhaust gas to nitrogen dioxide (NO2) in order to promote the reaction (fast reaction) by the above-mentioned chemical reaction equation (2). In this SCR catalyst, when a temperature range is exceeded in which the fast reaction is carried out in a suitable manner, the oxidation capacity or ability of the substance will increase. The higher the temperature of the SCR catalyst, the more remarkable this tendency becomes. Then, due to the oxidation ability of the substance, ammonia is oxidized to produce NOx.

On the other hand, when the inflow NOx concentration is made larger in accordance with the higher temperature of the SCR catalyst, the contact between ammonia and oxygen (i.e., the second reaction) will be suppressed in a more reliable manner. As a result, the increase in the outflow NOx amount resulting from the oxidation of ammonia can be suppressed to be small in a more reliable manner.

On the other hand, when the inflow NOx concentration is made larger in accordance with the higher temperature of the SCR catalyst, the equivalent ratio, which is a ratio of ammonia with respect to the inflow amount of NOx, becomes smaller. For that reason, the amount of NOx flowing out from the SCR catalyst without reacting with ammonia may become larger. However, when the amount of addition of the additive agent is also made larger in accordance with the higher temperature of the SCR catalyst, the decrease in the equivalent ratio is suppressed. As a result, the increase in the outflow NOx amount resulting from the increase in the inflow NOx concentration can also be suppressed to be small in a more reliable manner.

The exhaust gas purification apparatus for an internal combustion engine according to the present invention may be further provided with a NOx concentration detection means for detecting the inflow NOx concentration. Then, in the case where the temperature detected by the temperature detection means is higher than the predetermined temperature, when the inflow NOx concentration detected by the NOx concentration detection means at the time of the inflow NOx concentration being not increased is smaller than a lower limit value which is a minimum inflow NOx concentration at which the amount of NOx flowing out from the SCR catalyst can be decreased by increasing the inflow NOx concentration and the amount of addition of the additive agent, the control means may not increase the inflow NOx concentration, and may stop the addition of the additive agent by means of the supply device.

In the case where the inflow NOx concentration is small, the amount of increase in the inflow amount of NOx required in order to suppress the contact of ammonia and oxygen becomes large, and the amount of addition of the additive agent also accordingly increases. When the inflow NOx concentration becomes large and at the same time the amount of addition of the additive agent increases, but an absolute amount of the outflow NOx amount may increase, as compared with the case where the inflow NOx concentration and the amount of addition of the additive agent are not increased.

On the other hand, in the exhaust gas purification apparatus for an internal combustion engine of the present invention, the minimum inflow NOx concentration able to decrease the outflow NOx amount by increasing the inflow NOx concentration and the amount of addition of the additive agent is set as the lower limit value, so that in cases where the inflow NOx concentration at the time of not increasing the inflow NOx concentration is less than the lower limit value, the inflow NOx concentration is not increased. In that case, it is possible to suppress the increase in the outflow NOx amount resulting from the increase in the inflow NOx concentration.

When the additive agent is added while the inflow NOx concentration is small, ammonia in contact with oxygen in the exhaust gas increases, so that the outflow NOx amount becomes large. On the other hand, the increase in the outflow NOx amount resulting from the oxidation of ammonia is suppressed by stopping the addition of the additive agent.

Accordingly, in cases where the outflow NOx amount can not be decreased even if the inflow NOx concentration and the amount of addition of the additive agent are increased, in other words, incases where the outflow NOx amount is increased, on the contrary, by increasing the inflow NOx concentration and the amount of addition of the additive agent, it is possible to restrain the amount of NOx flowing out from the SCR catalyst to a minimum and at the same time, to suppress unnecessary consumption of the additive agent.

Here, note that, as described above, the higher the temperature of the SCR catalyst, the more remarkable the above-mentioned second reaction becomes. For that reason, the higher the temperature of the SCR catalyst, the more the amount of NOx required in order to suppress the oxidation reaction of ammonia becomes.

Accordingly, the higher the temperature of the SCR catalyst, the larger value the lower limit value may be set to. Thus, when the lower limit value is set in this manner, it is possible to prevent the inflow NOx concentration and the additive agent from being increased unnecessarily in a more reliable manner, while restraining the amount of NOx flowing out from the SCR catalyst to a minimum.

In addition, even in cases where the inflow NOx concentration is equal to or more than the lower limit value, there will be a possibility that the inflow NOx concentration can not be increased to a desired concentration, depending on the operating state of the internal combustion engine. Accordingly, the lower limit value may be set based on a maximum NOx concentration according to the operating state of the internal combustion engine (i.e., a maximum NOx concentration to which the NOx concentration can be increased in each operating state of the internal combustion engine).

Here, note that the NOx concentration detection means may be a unit that measures the inflow NOx concentration by the use of a NOx sensor arranged in the exhaust passage at the upstream side of the SCR catalyst, or may be a unit that estimates (calculates) the inflow NOx concentration from the operating state of the internal combustion engine (an amount of fuel injection, an amount of intake air, an engine rotation speed, an engine load, or the like).

Then, in the case where the temperature detected by the temperature detection means is higher than the predetermined temperature, when the inflow NOx concentration detected by the NOx concentration detection means at the time of the inflow NOx concentration being not increased is larger than an upper limit value which is a maximum inflow NOx concentration at which an amount of oxidation of ammonia can be decreased by increasing the inflow NOx concentration, the control means of the present invention may increase the amount of ammonia flowing into the SCR catalyst, without increasing the inflow NOx concentration.

When the inflow NOx concentration becomes large to some extent, even if the inflow NOx concentration is increased any further, the oxidation of ammonia can not be suppressed, but NOx passing or slipping through the SCR catalyst may increase. Accordingly, the exhaust gas purification apparatus for an internal combustion engine of the present invention sets as the upper limit value a maximum inflow NOx concentration at which the oxidation of ammonia can be suppressed by increasing the inflow NOx concentration, wherein when the inflow NOx concentration at the time of the inflow NOx concentration being not increased is larger than the upper limit value, the increase in the inflow NOx concentration is stopped, and only the amount of addition of the additive agent is increased. According to such a configuration, when the inflow NOx concentration is sufficiently large, it is possible to suppress an increase in the outflow NOx amount resulting from an unnecessary increase in the inflow NOx concentration.

Here, note that, as described above, the higher the temperature of the SCR catalyst, the more remarkable the above-mentioned second reaction becomes. For that reason, the higher the temperature of the SCR catalyst, the more the amount of NOx required in order to suppress the oxidation reaction of ammonia becomes.

Accordingly, the higher the temperature of the SCR catalyst, the larger value the upper limit value may be set to. In other words, the lower the temperature of the SCR catalyst, the smaller value the upper limit value may be set to. Thus, when the upper limit value is set in this manner, the outflow NOx amount can be suppressed to the minimum, while suppressing the unnecessary increase in the inflow NOx concentration.

In cases where the temperature detected by the temperature detection means is higher than the predetermined temperature, the control means of the present invention may obtain a minimum equivalent ratio at which the outflow NOx amount in the case of assuming that the inflow NOx concentration is increased becomes equal to or less than an allowable amount, in the relation between the inflow NOx concentration, the equivalent ratio and the outflow NOx amount, and may increase the amount of addition of the additive agent according to the minimum equivalent ratio.

When the equivalent ratio of the amount of ammonia with respect to the inflow amount of NOx is made excessively larger, the amount of consumption of the additive agent may increase. Accordingly, in cases where the inflow NOx concentration is increased, the minimum equivalent ratio at which the outflow NOx amount becomes equal to or less than the allowable amount may also be set as a target equivalent ratio. In addition, when the equivalent ratio at the time the inflow NOx concentration is increased becomes large to some extent, the outflow NOx amount will not sometimes decrease any more. In such a case, the amount of addition of the additive agent may be increased according to the minimum equivalent ratio at which the inflow NOx concentration becomes the smallest.

When the amount of addition of the additive agent is increased in this manner, the increase in the amount of NOx flowing out from the SCR catalyst can be suppressed to the minimum, while restraining the consumption amount of the additive agent to be small.

In the exhaust gas purification apparatus for an internal combustion engine according to the present invention, the control means may carry out processing in which the higher the temperature detected by the temperature detection means, the smaller the concentration of oxygen in the exhaust gas becomes. For example, the control means may adjust the amount of intake air or the amount of fuel injection in such a manner that the higher the temperature detected by the temperature detection means, the lower (i.e., the richer) the air fuel ratio of a mixture becomes.

The above-mentioned second reaction tends to be more remarkable in accordance with the higher temperature of the SCR catalyst. On the other hand, when the concentration of oxygen in the exhaust gas becomes smaller in accordance with the higher temperature of the SCR catalyst, the amount of oxygen in contact with ammonia can be decreased in a more reliable manner. As a result, the amount of NOx produced by the above-mentioned second reaction can be decreased more reliably. Thus, in cases where the SCR catalyst is exposed to a high temperature atmosphere, it is possible to make small the increase in the amount of NOx flowing out from the SCR catalyst in a more reliable manner.

In the exhaust gas purification apparatus for an internal combustion engine according to the present invention, the control means may carry out processing in which the higher the temperature detected by the temperature detection means, the larger the space velocity (SV) of the exhaust gas passing through the SCR catalyst becomes. The amount of NOx reduction or reduction by the SCR catalyst tends to increase in accordance with the increasing space velocity of the exhaust gas passing through the SCR catalyst. Accordingly, when the space velocity of the exhaust gas passing through the SCR catalyst is made larger in accordance with the higher temperature of the SCR catalyst, the decrease in the amount of NOx reduction or reduction can be suppressed in a more reliable manner. As a result, the increase in the outflow NOx amount can be suppressed to be small more reliably.

The exhaust gas purification apparatus for an internal combustion engine according to the present invention is effective for an exhaust gas purification apparatus in which an SCR catalyst is supported by a particulate filter. The exhaust gas purification apparatus having the SCR catalyst supported by the particulate filter (hereinafter, referred to as an "SCRF") is exposed to a high temperature atmosphere, not only also in cases where the internal combustion engine is operated under a high load, but also in cases where PM regeneration processing for oxidizing the PM trapped by the SCRF is carried out. In addition, in the case of the SCR catalyst being supported by the particulate filter, the distance from the internal combustion engine to the SCR catalyst may become short, so that the amount of heat transmitted from the exhaust gas to the SCR catalyst can be large. Accordingly, it can be said that the SCRF is easy to be exposed to a high temperature atmosphere as compared to the case where the particulate filter and the SCR catalyst are formed separately from each other. For that reason, if at least one of the above-mentioned various kinds of control is carried out at the time of the SCRF being exposed to the high temperature atmosphere, the decrease in the NOx reduction rate of the SCRF can be suppressed, so that the amount of NOx flowing out from the SCRF can be made small.

Advantageous Effects of Invention

According to the present invention, in an exhaust gas purification apparatus for an internal combustion engine which is provided with an SCR catalyst arranged in an exhaust passage of the internal combustion engine, and a supply device for supplying an additive agent, which is ammonia or a precursor of ammonia, to the SCR catalyst, the amount of NOx flowing out from the SCR catalyst can be suppressed from being increased, in cases where the SCR catalyst is exposed to a high temperature atmosphere.

BRIEF DESCRIPTION OF DRAWINGS

FIG. 1 is a view illustrating the schematic construction of an internal combustion engine and its intake and exhaust systems in a first embodiment of the present invention.

FIG. 2 is a view illustrating the relation between the temperature of an SCR catalyst and the NOx reduction rate of the SCR catalyst.

FIG. 3 is a view illustrating the relation between an inflow NOx concentration, an equivalent ratio and a NOx reduction rate in cases where the temperature of the SCR catalyst is equal to or higher than a predetermined temperature.

FIG. 4 is a view illustrating the relation between the inflow NOx concentration, the equivalent ratio and the NOx reduction rate in cases where the inflow NOx concentration is equal to or higher than a reference inflow NOx concentration.

FIG. 5 is a view illustrating the relation among the inflow NOx concentration, the equivalent ratio and an outflow NOx amount.

FIG. 6 is a view illustrating the relation between the equivalent ratio and the outflow NOx amount.

FIG. 7 is a view illustrating the relation between the temperature of the SCR catalyst and a target inflow NOx concentration.

FIG. 8 is a view illustrating the relation between the temperature of the SCR catalyst and a target equivalent ratio.

FIG. 9 is a timing chart illustrating an execution procedure for NOx decreasing processing.

FIG. 10 is a flowchart illustrating a processing routine which is executed by an ECU in cases where the temperature of the SCR catalyst is equal to or higher than the predetermined temperature in the first embodiment.

FIG. 11 is a view illustrating the schematic construction of an internal combustion engine and its intake and exhaust systems in a second embodiment of the present invention.

FIG. 12 is a view illustrating the relation among an inflow NOx concentration, an equivalent ratio and an outflow NOx amount.

FIG. 13 is a view illustrating the relation between the temperature of an SCR catalyst and a lower limit value.

FIG. 14 is a flow chart showing a processing routine which is executed by an ECU when the temperature of the SCR catalyst is equal to or higher than a predetermined temperature in the second embodiment.

FIG. 15 is a view illustrating the relation between the equivalent ratio and the outflow NOx amount in cases where the inflow NOx concentration is larger than an upper limit value.

FIG. 16 is a view illustrating the relation between the temperature of the SCR catalyst and the upper limit value.

FIG. 17 is a flow chart showing a processing routine which is executed by an ECU in the case where the temperature of an SCR catalyst is equal to or higher than a predetermined temperature in a third embodiment of the present invention.

FIG. 18 is a view illustrating the relation between the space velocity (SV) of exhaust gas passing through the SCR catalyst and an outflow NOx amount.

FIG. 19 is a view illustrating the relation between the temperature of the SCR catalyst and the space velocity (SV) of exhaust gas passing through the SCR catalyst.

FIG. 20 is a view illustrating the relation between the temperature of the SCR catalyst and the oxygen concentration of exhaust gas flowing into the SCR catalyst.

DESCRIPTION OF EMBODIMENTS

Hereinafter, specific embodiments of the present invention will be described based on the attached drawings. However, the dimensions, materials, shapes, relative arrangements and so on of component parts described in the embodiments are not intended to limit the technical scope of the present invention to these alone in particular as long as there are no specific statements.

First Embodiment

First, reference will be made to a first embodiment of the present invention on the basis of FIGS. 1 through 10. FIG. 1 is a view illustrating the schematic construction of an internal combustion engine and its intake and exhaust systems to which the present invention is applied. The internal combustion engine 1 shown in FIG. 1 is a compression ignition type internal combustion engine (diesel engine) having a plurality of cylinders. Here, note that the internal combustion engine to which the present invention is applied is not limited to internal combustion engines of compression ignition type, but may be internal combustion engines of spark ignition type (gasoline engines) in which a lean burn operation is carried out.

The internal combustion engine 1 is provided with fuel injection valves 1a for injecting fuel into corresponding cylinders, respectively. Further, an intake passage 2 and an exhaust passage 3 are connected to the internal combustion engine 1. The intake passage 2 is a passage for guiding fresh air (hereinafter simply air) taken in from the atmosphere to each cylinder of the internal combustion engine 1. The exhaust passage 3 is a passage for circulating or passing a burned gas (an exhaust gas) discharged from the interior of each cylinder of the internal combustion engine 1.

An intake air throttle valve (hereinafter simply a throttle valve) 4 is arranged in the middle of the intake passage 2. The throttle valve 4 is a valve mechanism which serves to adjust an amount of air to be sucked into each cylinder of the internal combustion engine 1 by changing the passage sectional area of the intake passage 2. Here, note that the throttle valve 4 is provided with a valve body and an electric motor for driving to open and close the valve body, wherein the electric motor is controlled by an ECU 10 to be described later, so that the degree of opening of the valve body is adjusted.

A first catalyst casing 5 and a second catalyst casing 6 are arranged in series with each other in the middle of the exhaust passage 3 in this order from an upstream side thereof. The first catalyst casing 5 has an oxidation catalyst and a particulate filter which are received in a cylindrical casing. At that time, the oxidation catalyst may be supported by a catalyst carrier which is arranged at the upstream side of the particulate filter, or may be supported by the particulate filter.

In addition, the second catalyst casing 6 is obtained by housing a catalyst carrier by which a selective catalytic reduction catalyst (SCR catalyst) is supported into a cylindrical casing. The catalyst carrier is formed by coating an alumina-based or zeolite-based active component (carrier)

on a substrate of monolithic type having a honeycomb-shaped cross section which is made, for example, of cordierite, Fe—Cr—Al heat resisting steel, etc. Moreover, a noble metal catalyst having oxidation ability (e.g., platinum (Pt), palladium (Pd), etc.) is supported by the catalyst carrier.

Here, note that in the interior of the second catalyst casing 6, at the downstream side of the SCR catalyst, there may be arranged a catalyst carrier that supports thereon an oxidation catalyst. The oxidation catalyst in that case is to oxidize, among a reducing agent supplied to the SCR catalyst, a part of the reducing agent having passed or slipped through the SCR catalyst.

An addition valve 7 for injecting an additive agent, which is ammonia ($NH_3$) or a precursor of ammonia, into the exhaust gas is mounted on the exhaust passage 3 at a location between the first catalyst casing 5 and the second catalyst casing 6. The addition valve 7 is a valve mechanism having a nozzle hole which is opened and closed by the movement of a needle. The addition valve 7 is connected to a tank 71 through a pump 70. The pump 70 draws the additive agent stored in the tank 71, and at the same time, pressure feeds the additive agent thus drawn to the addition valve 7. The addition valve 7 injects the additive agent pressure fed from the pump 70 into the exhaust passage 3. Here, note that the addition valve 7 and the pump 70 are one form of a supply device according to the present invention.

Here, as the additive agent stored in the tank 71, there can be used an aqueous solution of urea, ammonium carbamate, etc., or ammonia gas. In this embodiment, reference will be made to an example in which a urea aqueous solution is used as the additive agent.

When the urea aqueous solution is injected from the addition valve 7, the urea aqueous solution flows into the second catalyst casing 6 together with the exhaust gas. At that time, the urea aqueous solution is thermally decomposed by receiving the heat of the exhaust gas, or is hydrolyzed by the SCR catalyst. When the urea aqueous solution is thermally decomposed or hydrolyzed, ammonia ($NH_3$) is produced. The ammonia produced in this manner is adsorbed (or occluded) to the SCR catalyst. The ammonia adsorbed to the SCR catalyst reacts with the nitrogen oxides (NOx) contained in the exhaust gas to produce nitrogen ($N_2$) and water ($H_2O$). Namely, ammonia functions as a reducing agent for NOx.

Further, the internal combustion engine 1 is provided with an exhaust gas recirculation (EGR) device that includes an EGR passage 100 through which the intake passage 2 and the exhaust passage 3 are placed in communication with each other, and an EGR valve 101 which changes the passage sectional area of the EGR passage 100. The EGR passage 100 is a passage which serves to guide a part of the exhaust gas flowing through the exhaust passage 3 to a portion of the intake passage 2 at the downstream side of the throttle valve 4 as an EGR gas. The EGR valve 101 is a valve mechanism which serves to adjust the amount of EGR gas supplied to the intake passage 2 from the exhaust passage 3, by changing the passage sectional area of the EGR passage 100. Here, note that the EGR valve 101 is provided with a valve body and an electric motor for driving to open and close the valve body, wherein the electric motor is controlled by the ECU 10 to be described later.

The ECU 10 is provided in combination with the internal combustion engine 1 as constructed in this manner. The ECU 10 is an electronic control unit which is provided with a CPU, a ROM, a RAM, a backup RAM, and so on. The ECU 10 is electrically connected to a variety of kinds of sensors such as a first exhaust gas temperature sensor 8, a second exhaust gas temperature sensor 9, a crank position sensor 11, an accelerator position sensor 12, an air flow meter 13, an air fuel ratio (A/F) sensor 14, and so on.

The first exhaust gas temperature sensor 8 is arranged in the exhaust passage 3 at a location downstream of the first catalyst casing 5 and upstream of the second catalyst casing 6, and outputs an electric signal correlated with the temperature of the exhaust gas which flows out from the first catalyst casing 5. The second exhaust gas temperature sensor 9 is arranged in the exhaust passage 3 at a location downstream of the second catalyst casing 6, and outputs an electric signal correlated with the temperature of the exhaust gas flowing out from the second catalyst casing 6, in other words, the temperature of the SCR catalyst received in the second catalyst casing 6.

The crank position sensor 11 outputs an electric signal correlated with the rotational position of an output shaft (crankshaft) of the internal combustion engine 1. The accelerator position sensor 12 outputs an electric signal correlated with the amount of operation of an accelerator pedal (i.e., the degree of opening or depression of an accelerator pedal). The air flow meter 13 outputs an electric signal correlated with the amount of air (i.e., the amount of intake air) sucked into the internal combustion engine 1. The A/F sensor 14 is arranged in the exhaust passage 3 at a location upstream of the first catalyst casing 5, and outputs an electric signal correlated with the air fuel ratio of the exhaust gas.

The ECU 10 is electrically connected to the various kinds of equipment such as the fuel injection valves 1a, the throttle valve 4, the addition valve 7, the pump 70, the EGR valve 101, and so on. The ECU 10 controls the above-mentioned variety of kinds of equipment in an electrical manner based on the output signals of the above-mentioned variety of kinds of sensors. For example, in addition to known control operations such as fuel injection control of the internal combustion engine 1, addition control to cause the additive agent to be injected intermittently from the addition valve 7, etc., the ECU 10 carries out processing for suppressing an increase in the amount of NOx flowing out from the SCR catalyst to be small (hereinafter, referred to as "NOx decreasing processing"), when the temperature of the SCR catalyst placed in the second catalyst casing 6 is high. In the following, a method of carrying out the NOx decreasing processing in this embodiment will be described.

First, a temperature range in which NOx reduction ability of the SCR catalyst is activated (NOx reduction window) will be described on the basis of FIG. 2. A horizontal axis in FIG. 2 represents the temperature of the SCR catalyst, and a vertical axis represents the NOx reduction rate of the SCR catalyst (i.e., the ratio of the amount of NOx reduced by the SCR catalyst with respect to the amount of NOx flowing into the SCR catalyst).

When the temperature of the SCR catalyst is equal to or less than a predetermined temperature Te0, the NOx reduction rate increases as the temperature of the SCR catalyst becomes higher. Then, when the temperature of the SCR catalyst goes up to the predetermined temperature Te0, the NOx reduction rate of the SCR catalyst becomes a maximum. Moreover, when the temperature of the SCR catalyst exceeds the predetermined temperature Te0, the NOx reduction rate decreases as the temperature of the SCR catalyst becomes higher.

Here, in cases where the internal combustion engine 1 is operated at a high load, or in cases where processing to oxidize and remove the PM trapped in the particulate filter of the first catalyst casing 5 (PM regeneration processing) is performed, the temperature of the SCR catalyst may become higher than the predetermined temperature Te0. In that case, the amount of NOx flowing out from the SCR catalyst may become large.

Accordingly, in the NOx decreasing processing of this first embodiment, when the temperature of the SCR catalyst is higher than the predetermined temperature Te0, the concentration of NOx in the exhaust gas flowing into the SCR catalyst (inflow NOx concentration) is made to increase more and the amount of addition of the additive agent is made to increase more so as to make large an equivalent ratio (a ratio of the amount of ammonia with respect to the amount of NOx contained in the exhaust gas flowing into the SCR catalyst (the inflow amount of NOx)), as compared to when it is equal to or less than the predetermined temperature Te0.

The ammonia supplied to the SCR catalyst can react with the NOx and oxygen ($O_2$) in the exhaust gas. Incases where ammonia reacts with NOx, the following chemical reaction equations (1) through (3) are established (first reactions). On the other hand, in cases where ammonia reacts with oxygen, the following chemical reaction equation (4) is established (second reaction).

$$4NO+4NH_3+O_2 \rightarrow 4N_2+6H_2O \quad (1)$$

$$NO+NO_2+2NH_3 \rightarrow 2N_2+3H_2O \quad (2)$$

$$6NO_2+8NH_3 \rightarrow 7N_2+12H_2O \quad (3)$$

$$NH_3+O_2 \rightarrow NOx+H_2O \quad (4)$$

Here, when the temperature of the SCR catalyst is higher than the predetermined temperature Te0, the above-mentioned second reaction becomes dominant. The higher the temperature of the SCR catalyst becomes in a temperature range in which the temperature of the SCR catalyst can be found, the more remarkable this tendency becomes.

On the other hand, when the inflow NOx concentration is increased in a state where the temperature of the SCR catalyst is higher than the predetermined temperature Te0, the ratio that NOx occupies in the exhaust gas flowing into the SCR catalyst becomes large, so that the amount of ammonia in contact with oxygen in the SCR catalyst decreases, and accordingly, the amount of ammonia in contact with NOx increases. As a result, the above-mentioned second reaction is suppressed, and the amount of ammonia to be converted into NOx decreases. In other words, an increase in the outflow NOx amount (the amount of NOx flowing out from the SCR catalyst) resulting from the oxidation of ammonia can be suppressed to be small.

By the way, when the inflow NOx concentration is increased, the equivalent ratio of ammonia with respect to the inflow amount of NOx becomes smaller, so that the amount of NOx not in contact (reaction) with ammonia may become larger. However, when the equivalent ratio of the amount of ammonia with respect to the inflow amount of NOx is also increased in accordance with the increase in the inflow NOx concentration, the amount of ammonia in contact with the amount of increase in the inflow amount of NOx will increase. In addition, when the equivalent ratio of the amount of ammonia with respect to the inflow amount of NOx is made larger than 1, it can also be expected that the NOx produced by the above-mentioned second reaction in addition to the amount of increase in the inflow amount of NOx is reduced. As a result, it is also possible to suppress the increase in the outflow NOx amount at the time of the inflow NOx concentration being increased to be small.

Here, the relation between the inflow NOx concentration, the equivalent ratio and the NOx reduction rate in the case where the temperature of the SCR catalyst is a constant temperature higher than the predetermined temperature Te0 is shown in FIG. 3. A solid line in FIG. 3 indicates a NOx reduction rate at the time when the inflow NOx concentration is a first inflow NOx concentration Cnoxin1 which is sufficiently smaller than oxygen ($O_2$) concentration in the exhaust gas. An alternate long and short dash line in FIG. 3 indicates a NOx reduction rate at the time when the inflow NOx concentration is a second inflow NOx concentration Cnoxin2 which is larger than the first inflow NOx concentration Cnoxin1 and which is equivalent to the oxygen concentration in the exhaust gas. A dotted line in FIG. 3 indicates a NOx reduction rate at the time when the inflow NOx concentration is a third inflow NOx concentration Cnoxin3 which is larger than the second inflow NOx concentration Cnoxin2 and which is sufficiently larger than the oxygen concentration in the exhaust gas.

In FIG. 3, when the inflow NOx concentration is the first inflow NOx concentration Cnoxin1, the larger the equivalent ratio, the lower the NOx reduction rate becomes. This is assumed due to the fact that the ratio occupied by the NOx in the exhaust gas is sufficiently small as compared to the ratio occupied by oxygen, so that when the equivalent ratio is made larger, an amount of increase in the amount of ammonia in contact with oxygen becomes larger as compared to an amount of increase in the amount of ammonia in contact with NOx.

When the inflow NOx concentration is the second inflow NOx concentration Cnoxin1, the NOx reduction rate does not substantially change, even if the equivalent ratio becomes larger. This is assumed due to the fact that the ratio occupied by the NOx in the exhaust gas is equivalent to the ratio occupied by oxygen, so that when the equivalent ratio is made larger, the amount of ammonia in contact with NOx increases in the same manner as the amount of ammonia in contact with oxygen.

When the inflow NOx concentration is the third inflow NOx concentration Cnoxin3 which is larger than the second inflow NOx concentration Cnoxin2, the larger the equivalent ratio, the larger the NOx reduction rate becomes. This is assumed due to the fact that the ratio occupied by the NOx in the exhaust gas is sufficiently large as compared to the ratio occupied by oxygen, so that when the equivalent ratio is made larger, the amount of increase in the amount of ammonia in contact with NOx becomes larger than the amount of increase in the amount of ammonia in contact with oxygen.

In view of the characteristics shown in FIG. 3, when the equivalent ratio is made larger at the time of the inflow NOx concentration being larger than the second inflow NOx concentration Cnoxin2, the NOx reduction rate can be made higher. In addition, when the inflow NOx concentration is larger than the second inflow NOx concentration Cnoxin2, the larger the inflow NOx concentration Cnoxin, the larger the NOx reduction rate at the time of the equivalent ratio being made larger becomes, as shown in FIG. 4. Accordingly, it is desirable that the inflow NOx concentration be made to increase up to a concentration which is larger than the second inflow NOx concentration Cnoxin2. Hereinafter, the second inflow NOx concentration Cnoxin2 is referred to as a reference inflow NOx concentration Cnoxin0.

However, when the inflow NOx concentration is made excessively large as compared with the reference inflow NOx concentration Cnoxin0, the NOx reduction rate can be made high due to the increase in the equivalent ratio, but the absolute amount of NOx flowing out from the SCR catalyst (i.e., the outflow NOx amount) may increase. For example, when the inflow NOx concentration before the increase is smaller than the reference inflow NOx concentration Cnoxin0 and the inflow NOx concentration is greatly increased to a concentration larger than the reference inflow NOx concentration Cnoxin0, even if the equivalent ratio is increased, the outflow NOx amount after the inflow NOx concentration is increased may become larger, as compared with the outflow NOx amount before the inflow NOx concentration is increased.

FIG. 5 is a view illustrating the relation among the inflow NOx concentration, the equivalent ratio and the outflow NOx amount. A solid line in FIG. 5 indicates an outflow NOx amount at the time when the inflow NOx concentration is at the above-mentioned. An alternate long and short dash line in FIG. 5 indicates an outflow NOx amount at the time when the inflow NOx concentration is a fifth inflow NOx concentration Cnoxin5 which is larger than the reference inflow NOx concentration Cnoxin0. A dotted line in FIG. 5 indicates an outflow NOx amount at the time when the inflow NOx concentration is a sixth inflow NOx concentration Cnoxin6 which is further larger than the fifth inflow NOx concentration Cnoxin5.

The outflow NOx amount at the time of the equivalent ratio being increased becomes smaller, when the inflow NOx concentration is the fifth inflow NOx concentration Cnoxin5 than when the inflow NOx concentration is the fourth inflow NOx concentration Cnoxin. On the other hand, when the inflow NOx concentration is the sixth inflow NOx concentration Cnoxin6, the outflow NOx amount can be made smaller by increasing the equivalent ratio, but the absolute amount of the outflow NOx amount becomes larger than when the inflow NOx concentration is the fourth inflow NOx concentration Cnoxin4. Accordingly, when the inflow NOx concentration is made to increase from the fourth inflow NOx concentration Cnoxin4 to the fifth inflow NOx concentration Cnoxin5, the outflow NOx amount can be decreased by increasing the equivalent ratio, but when the inflow NOx concentration is made to increase from the fourth inflow NOx concentration Cnoxin4 to the sixth inflow NOx concentration Cnoxin6, even if the equivalent ratio is increased, the outflow NOx amount cannot be decreased, but the absolute amount thereof will be increased on the contrary.

Accordingly, in this embodiment, a minimum inflow NOx concentration (a target inflow NOx concentration) and a minimum equivalent ratio (a target equivalent ratio) have been obtained experimentally in advance at which the outflow NOx amount after increasing the inflow NOx concentration and the equivalent ratio becomes smaller with respect to the outflow NOx amount before increasing the inflow NOx concentration and the equivalent ratio. Here, note that the target equivalent ratio may be an equivalent ratio at which the outflow NOx amount becomes the smallest, in the case where the inflow NOx concentration is equal to the target inflow NOx concentration. However, when the equivalent ratio becomes large to a certain extent, the outflow NOx amount may not sometimes decrease any more, as shown in FIG. 6. In such a case, a minimum equivalent ratio (e.g., er0 in FIG. 6), at which the outflow NOx amount becomes the smallest, may be set as the target equivalent ratio.

In addition, the higher the temperature of the SCR catalyst, the more remarkable the above-mentioned second reaction becomes, and hence, it is desirable that the target inflow NOx concentration be made larger, as the temperature of the SCR catalyst becomes higher, as shown in FIG. 7. In this embodiment, the relation between the target inflow NOx concentration and the temperature of the SCR catalyst as shown in FIG. 7 has been made into a map in advance, and such a map has been stored in the ROM of the ECU 10. Similarly, it is also desirable that the target equivalent ratio be made larger, as the temperature of the SCR catalyst becomes higher, as shown in FIG. 8. Accordingly, the relation between the target equivalent ratio and the temperature of the SCR catalyst as shown in FIG. 8 has been made into a map in advance, and this map has been stored in the ROM of the ECU 10. Here, note that instead of the map shown in FIG. 8, the relation between a target amount of addition of the additive agent and the temperature of the SCR catalyst may be mapped in advance. In that case, the target amount of addition of the additive agent need only be set to be larger, as the temperature of the SCR catalyst becomes higher.

When the target inflow NOx concentration and the target equivalent ratio are decided according to the maps as shown in the FIGS. 7 and 8, the temperature of the SCR catalyst exceeds the predetermined temperature Te0, the inflow NOx concentration and the equivalent ratio will be increased in proportion to the temperature of the SCR catalyst, as shown in FIG. 9. As a result, it is possible to increase the amount of NOx reacting with ammonia, while suppressing the increase in the amount of ammonia reacting with oxygen to be small. In other words, it is possible to increase the amount of NOx which is removed or reduced by the above-mentioned first reactions, while suppressing the amount of NOx produced by the above-mentioned second reaction to be small. Moreover, when the equivalent ratio at the time of the temperature of the SCR catalyst exceeding the predetermined temperature Te0 is made larger than 1, the NOx produced by the above-mentioned second reaction can also be reduced. Accordingly, in the case where the temperature of the SCR catalyst is higher than the predetermined temperature Te0, it is possible to make small the increase in the outflow NOx amount, while suppressing the decrease in the rate of NOx reduction to be small.

Here, note that as a specific method to increase the inflow NOx concentration, there can be used a method of advancing the fuel injection timing of the fuel injection valves 1a, a method of decreasing the amount of EGR gas introduced to the intake passage 2 by means of an EGR device, or a method using these methods in combination. Specifically, the larger the target inflow NOx concentration, the more the amount of advance of the fuel injection timing need only be made, and/or the smaller the amount of EGR gas need only be made.

Hereinafter, an execution procedure of the NOx decreasing processing in this embodiment will be described in line with FIG. 10. FIG. 10 shows a processing routine which is repeatedly executed by the ECU 10 at the time when the temperature of the SCR catalyst is higher than the predetermined temperature Te0. This processing routine has been stored in the ROM of the ECU 10 in advance.

In the processing routine of FIG. 10, the ECU 10 first reads in the temperature Tescr of the SCR catalyst in the processing of step S101. The temperature Tescr of the SCR catalyst may be estimated based on the operation history of the internal combustion engine 1, or may be replaced by the measured value of the second exhaust gas temperature sensor 9. Here, note that a "temperature detection means" according to the present invention is achieved by carrying out the processing of step S101 by means of the ECU 10.

In the processing of step S102, the ECU 10 determines whether the temperature Tescr thus read in the processing of step S101 is higher than the predetermined temperature Te0. When a negative determination is made in the processing of step S102 (Tescr≤Te0), the ECU 10 ends the execution of this routine. In that case, the inflow NOx concentration is not increased, but the additive agent is added in such a manner that the equivalent ratio of the amount of ammonia with respect to the inflow amount of NOx becomes substantially 1. On the other hand, when an affirmative determination is made in the processing of step S102 (i.e., Tescr>Te0), the ECU 10 goes to the processing of step S103.

In the processing of step S103, the ECU 10 obtains the target inflow NOx concentration based on the temperature Tescr read in the processing of step S101 and the map of FIG. 7.

In the processing of step S104, the ECU 10 obtains the target equivalent ratio based on the temperature Tescr read in the processing of step S101 and the map of FIG. 8.

In the processing of step S105, the ECU 10 calculates the fuel injection timing or the amount of EGR gas in which the concentration of NOx contained in the exhaust gas of the internal combustion engine 1 becomes equal to the target inflow NOx concentration obtained in the processing of step S103. At that time, the larger the target inflow NOx concentration, the more the amount of advance of the fuel injection timing is made, or the smaller the amount of EGR gas is made.

In the processing of step S106, the ECU 10 obtains an amount of NOx flowing into the SCR catalyst (an inflow amount of NOx) at the time of the inflow NOx concentration being increased to the target inflow NOx concentration, by multiplying the target inflow NOx concentration and a flow rate of the exhaust gas (a total sum of the amount of intake air and the amount of fuel injection) with each other, and calculates an amount of the additive agent (a target amount of addition) in which the equivalent ratio of ammonia with respect to the inflow amount of NOx becomes equal to the target equivalent ratio obtained in the processing of step S104.

In the processing of step S107, the ECU 10 performs the NOx decreasing processing. Specifically, the ECU 10 increases the inflow NOx concentration and the equivalent ratio by controlling the fuel injection valves 1a or the EGR device according to the fuel injection timing or the amount of EGR gas calculated in the processing of step S105, and by controlling the addition valve 7 according to the target amount of addition calculated in the processing of step S106.

Here, note that by carrying out the processing of steps S103 through S107 by means of the ECU 10, a control means according to the present invention is achieved.

When the NOx decreasing processing is carried out according to the processing routine of FIG. 10, the reaction of ammonia and NOx can be promoted, while suppressing the reaction of ammonia and oxygen, in cases where the temperature of the SCR catalyst is equal to or higher than the predetermined temperature Te0. As a result, in cases where the temperature of the SCR catalyst is equal to or higher than the predetermined temperature Te0, it is possible to make small the increase in the outflow NOx amount, while suppressing the decrease in the rate of NOx reduction to be small.

Here, note that in this embodiment, reference has been made to an example in which the temperature at the time when the NOx reduction rate becomes the maximum in the relation between the temperature of the SCR catalyst and the NOx reduction rate of the SCR catalyst is set as the predetermined temperature Te0, a temperature, which is obtained by subtracting a margin from the lowest temperature at which the amount of NOx flowing out from the SCR catalyst becomes smaller than an allowable amount, may be set as the predetermined temperature Te0. The "allowable amount" referred to herein is an outflow NOx amount which is appropriately decided based on related laws and regulations, etc.

Second Embodiment

Now, reference will be made to a second embodiment of the present invention on the basis of FIGS. 11 through 14. Here, a construction different from that of the above-mentioned first embodiment will be described, and an explanation of the same or similar components will be omitted.

The difference of this second embodiment from the above-mentioned first embodiment is that when the amount of NOx flowing into the SCR catalyst is smaller than a lower limit value in a state where the temperature of the SCR catalyst is higher than the predetermined temperature, the inflow NOx concentration is not increased, and the addition of the additive agent is stopped.

FIG. 11 is a view illustrating the schematic construction of an internal combustion engine 1 and its intake and exhaust systems according to this second embodiment of the present invention. In FIG. 11, the same reference signs are attached to the same or similar components as those in the above-mentioned first embodiment.

As shown in FIG. 11, a NOx sensor 15 is arranged in the exhaust passage 3 at a location between the first catalyst casing 5 and the second catalyst casing 6. The NOx sensor 15 outputs an electrical signal which is correlated with the concentration of NOx contained in the exhaust gas flowing into the second catalyst casing 6. The output signal of the NOx sensor 15 is inputted to the ECU 10. Here, note that the other constructions of this second embodiment are the same as those of the above-mentioned first embodiment.

When the output signal (NOx concentration) of the NOx sensor 15 is equal to or larger than a predetermined lower limit value in the case where the temperature of the SCR catalyst is higher than the predetermined temperature Te0, the ECU 10 increases the inflow NOx concentration and the amount of the additive agent according to the method described in the above-mentioned first embodiment. On the other hand, when the inflow NOx concentration in the SCR catalyst is smaller than the lower limit value, the inflow NOx concentration is not increased, and the addition of the additive agent is stopped.

Here, as described in the above-mentioned first embodiment, in cases where the inflow NOx concentration is smaller than the reference inflow NOx concentration Cnoxin0, it is necessary to increase the inflow NOx concentration to a concentration larger than the reference inflow NOx concentration Cnoxin0. However, when the inflow NOx concentration is increased to the concentration larger than the reference inflow NOx concentration Cnoxin0, while the inflow NOx concentration is sufficiently smaller than the reference inflow NOx concentration Cnoxin0, the NOx reduction rate may become high due to the increase in the equivalent ratio, but the outflow NOx amount may increase on the contrary.

FIG. 12 is a view illustrating the relation among the inflow NOx concentration, the equivalent ratio and the outflow NOx amount. A solid line in FIG. 12 indicates an outflow NOx amount at the time when the inflow NOx concentration is a seventh inflow NOx concentration Cnoxin7 which is sufficiently smaller with respect to the above-mentioned reference inflow NOx concentration Cnoxin0, and a dotted line in FIG. 12 indicates an outflow NOx amount at the time when the inflow NOx concentration is an eighth inflow NOx concentration Cnoxin8 which is larger than the reference inflow NOx concentration Cnoxin0.

When the inflow NOx concentration is the eighth inflow NOx concentration Cnoxin8, the outflow NOx amount becomes larger than when the inflow NOx concentration is the seventh inflow NOx concentration Cnoxin7. This relation does not change even if the equivalent ratio is increased at the time when the inflow NOx concentration is the eighth inflow NOx concentration Cnoxin8. In addition, when the inflow NOx concentration is the seventh inflow NOx concentration Cnoxin7, the outflow NOx amount becomes smaller in accordance with the decreasing equivalent ratio, and the outflow NOx amount in the case of the additive agent being not added (in the case of the equivalent ratio being zero) becomes the smallest.

Accordingly, in this second embodiment, a minimum inflow NOx concentration at which the outflow NOx amount can be decreased by increasing the inflow NOx concentration and the equivalent ratio is set as the lower limit value, wherein when the inflow NOx concentration before the inflow NOx concentration is increased is below the lower limit value, the inflow NOx concentration is not increased, and the addition of the additive agent is stopped. In that case, an increase in the outflow NOx amount resulting from an increase in the inflow NOx concentration can be suppressed, and at the same time, an increase in the outflow NOx amount resulting from an increase in the equivalent ratio can also be suppressed.

Here, note that when the temperature of the SCR catalyst is high, the reaction of ammonia and oxygen becomes more remarkable as compared to the case where the temperature of the SCR catalyst is low. For that reason, when the temperature of the SCR catalyst is high, the amount of NOx required in order to suppress the oxidation reaction of ammonia becomes larger than when the temperature of the SCR catalyst is low. Accordingly, the lower limit value may be made larger as the temperature of the SCR catalyst becomes higher, as shown in FIG. 13. Thus, when the lower limit value is set in this manner, it is possible to prevent the inflow NOx concentration and the equivalent ratio from being increased unnecessarily in a more reliable manner, while restraining the amount of NOx flowing out from the SCR catalyst to a minimum.

Hereinafter, an execution procedure of the NOx decreasing processing in this second embodiment will be described in line with FIG. 14. FIG. 14 shows a processing routine which is repeatedly executed by the ECU 10 at the time when the temperature of the SCR catalyst is higher than the predetermined temperature Te0. This processing routine has been stored in the ROM of the ECU 10 in advance. Here, note that in FIG. 14, the same reference signs are attached to the same processings as in the above-mentioned processing routine of FIG. 10.

In the processing routine of FIG. 14, when an affirmative determination is made in the processing of step S102 (i.e., Tescr>Te0), the ECU 10 carries out the processing of step S201. In the processing of step S201, the ECU 10 reads in an output signal (inflow NOx concentration) Cnoxin of the NOx sensor 15.

The ECU 10 carries out the processing of step S202 after the execution of the processing of step S201. In the processing of S202, the ECU 10 determines whether the inflow NOx concentration Cnoxin read in the processing of step S201 is equal to or more than a lower limit value Llow. The lower limit value Llow is obtained based on the output signal of the second exhaust gas temperature sensor 9 (the temperature of the SCR catalyst) and a map as shown in FIG. 13.

When an affirmative determination is made in the processing of step S202 (Cnoxin Llow), the ECU 10 carries out the processing of steps S103 through S107. That is, the ECU 10 carries out the NOx decreasing processing according to the same procedure as in the above-mentioned first embodiment.

When a negative determination is made in the processing of step S202 (Cnoxin<Llow), the ECU 10 carries out the processing of step S203. That is, the ECU 10 does not increase the inflow NOx concentration, and stops the addition of the additive agent.

Thus, when the NOx decreasing processing is carried out according to the processing routine of FIG. 14, the same effects or advantages as those in the above-mentioned first embodiment can be obtained, and at the same time, the outflow NOx amount can be suppressed to a minimum in cases where the outflow NOx amount cannot be decreased even if the inflow NOx concentration and the equivalent ratio are increased.

Here, note that in this embodiment, reference has been made to an example in which the inflow NOx concentration is obtained by using the NOx sensor 15, but the inflow NOx concentration may be calculated (estimated) by using as a parameter the operating state of the internal combustion engine 1 (i.e., the amount of fuel injection, the amount of intake air, the accelerator opening degree, or the like).

In addition, even in cases where the inflow NOx concentration is equal to or more than the lower limit value, there will be a possibility that the inflow NOx concentration can not be increased to a desired concentration, depending on the operating state of the internal combustion engine 1. Accordingly, the lower limit value may be corrected according to the operating state of the internal combustion engine 1.

Third Embodiment

Next, reference will be made to a third embodiment of the present invention based on FIGS. 15 through 17. Here, a construction different from that of the above-mentioned first embodiment will be described, and an explanation of the same construction will be omitted.

The difference of this third embodiment from the above-mentioned first embodiment is that when the inflow NOx concentration is larger than a predetermined upper limit value in the case where the temperature of the SCR catalyst is higher than the predetermined temperature, the inflow NOx concentration is not increased, and only an increase of the equivalent ratio is carried out.

Specifically, when the inflow NOx concentration is equal to or less than the predetermined upper limit value in the case where the temperature of the SCR catalyst is higher than the predetermined temperature Te0, the ECU 10 increases the inflow NOx concentration and the equivalent ratio according to the method described in the above-mentioned first embodiment. On the other hand, when the inflow NOx concentration is larger than the upper limit value, the inflow NOx concentration is not increased, and only the equivalent ratio is increased.

Here, when the inflow NOx concentration becomes sufficiently larger with respect to the reference inflow NOx concentration Cnoxin0, even if the inflow NOx concentration is increased any further, the amount of ammonia reacting with NOx does not increase, but the amount of NOx passing or slipping through the SCR catalyst increases. Accordingly, in this third embodiment, a maximum inflow NOx concentration at which the amount of ammonia in contact with NOx can be increased by increasing the inflow NOx concentration is set as the upper limit value, wherein when the inflow NOx concentration is larger than the upper limit value, the inflow NOx concentration is not increased, and only the equivalent ratio is increased. In addition, the amount of SCR catalyst received in the second catalyst casing 6 is limited, and hence, when the equivalent ratio becomes large to some extent at the time of the inflow NOx concentration being equal to or more than the upper limit value, the amount of NOx reacting with ammonia will not increase any more.

FIG. 15 is a view illustrating the relation between the equivalent ratio and the outflow NOx amount at the time when the inflow NOx concentration is larger than the upper limit value. As shown in FIG. 15, in the case where the inflow NOx concentration is larger than the upper limit value, when the equivalent ratio is smaller than a predetermined amount er1, the outflow NOx amount decreases in accordance with the increasing equivalent ratio. However, when the equivalent ratio becomes equal to or more than the predetermined amount er1, the reaction of NOx and ammonia by the SCR catalyst is saturated, and hence, even if the equivalent ratio is increased from the predetermined amount er1, the outflow NOx amount does not substantially decrease. Accordingly, a minimum equivalent ratio (i.e., the predetermined amount er1 in FIG. 15) at which the outflow NOx amount becomes the smallest is set as a target equivalent ratio, so that the amount of addition of the additive agent need only be increased according to the target equivalent ratio. According to such a method, when the inflow NOx concentration is larger than the upper limit value, it is possible to suppress the outflow NOx amount to a minimum, while restraining the consumption amount of the additive agent to a minimum.

Here, note that when the temperature of the SCR catalyst is high, the reaction of ammonia and oxygen becomes more remarkable as compared to the case where the temperature of the SCR catalyst is low. For that reason, when the temperature of the SCR catalyst is high, the inflow NOx concentration required in order to suppress the oxidation reaction of ammonia becomes larger than when the temperature of the SCR catalyst is low. Accordingly, the upper limit value may be made larger as the temperature of the SCR catalyst becomes higher, as shown in FIG. 16. Thus, when the upper limit value is set in this manner, the outflow NOx amount can be suppressed to a minimum, while constraining the consumption amount of the additive agent to a minimum.

Hereinafter, an execution procedure of the NOx decreasing processing in this third embodiment will be described in line with FIG. 17. FIG. 17 shows a processing routine which is repeatedly executed by the ECU 10 at the time when the temperature of the SCR catalyst is higher than the predetermined temperature Te0. This processing routine has been stored in the ROM of the ECU 10 in advance. Here, note that in FIG. 17, the same reference signs are attached to the same processings as in the above-mentioned processing routine of FIG. 10.

In the processing routine of FIG. 17, when an affirmative determination is made in the processing of step S102 (i.e., Tescr>Te0), the ECU 10 carries out the processing of step S301. In the processing of step S301, the ECU 10 reads in an inflow NOx concentration Cnoxin. The inflow NOx concentration Cnoxin may be calculated based on the operating state of the internal combustion engine 1, or may be measured by means of the NOx sensor 15 which is arranged in the exhaust passage 3 at a location between the first catalyst casing 5 and the second catalyst casing 6, similar to the above-mentioned second embodiment.

The ECU 10 carries out the processing of step S302 after the execution of the processing of step S301. In the processing of S302, the ECU 10 determines whether the inflow NOx concentration Cnoxin read in the processing of step S301 is equal to or less than an upper limit value Lhigh. The upper limit value Lhigh is obtained based on the output signal of the second exhaust gas temperature sensor 9 (the temperature of the SCR catalyst) and a map as shown in FIG. 16.

When an affirmative determination is made in the processing of step S302 (Cnoxin Llow), the ECU 10 carries out the processing of steps S103 through S107. That is, the ECU 10 carries out the NOx decreasing processing according to the same procedure as in the above-mentioned first embodiment.

On the other hand, when a negative determination is made in the processing of step S302 (Cnoxin>Lhigh), the ECU 10 carries out the processing of step S303. That is, the ECU 10 does not increase the inflow NOx concentration, but increases the amount of addition of the additive agent (i.e., increases the equivalent ratio). In that case, the ECU 10 obtains the minimum equivalent ratio at which the outflow NOx amount becomes the smallest, and increasing the amount of addition of the additive agent according to the equivalent ratio, as described in the above-mentioned explanation of FIG. 15.

Thus, when the NOx decreasing processing is carried out according to the processing routine of FIG. 17, the same effects or advantages as those in the above-mentioned first embodiment can be obtained, and at the same time, the increase in the outflow NOx amount and the increase in the consumption amount of the additive agent resulting from an unnecessary increase in the inflow NOx concentration can be suppressed.

Here, note that the NOx decreasing processing of this third embodiment can also be combined with the NOx decreasing processing of the above-mentioned second embodiment. In that case, the outflow NOx amount at the time of the inflow NOx concentration being smaller than the lower limit value in addition to that at the time of the inflow NOx concentration being larger than the upper limit value can be suppressed to a minimum, and at the same time, the amount of consumption of the additive agent can be suppressed to a minimum.

Fourth Embodiment

Further, reference will be made to a fourth embodiment of the present invention based on FIGS. 18 through 19. Here, a construction different from that of the above-mentioned first embodiment will be described, and an explanation of the same or similar parts will be omitted.

The difference of this fourth embodiment from the above-mentioned first embodiment is that when the NOx decreasing processing is carried out, the space velocity (SV) of the exhaust gas passing through the SCR catalyst is made larger, as the temperature of the SCR catalyst becomes higher.

FIG. 18 is a view illustrating the relation between the space velocity (SV) of the exhaust gas passing through the SCR catalyst, and the outflow NOx amount, in the case where the temperature of the SCR catalyst is higher than the predetermined temperature Te0. As shown in FIG. 18, the outflow NOx amount becomes smaller in accordance with the increasing space velocity (SV) of the exhaust gas passing through the SCR catalyst. This is considered to be due to the fact that active spots of the SCR catalyst are increased by the increase in the space velocity (SV), and the amount of reaction of NOx and ammonia is accordingly increased.

Accordingly, as shown in FIG. 19, when the space velocity (SV) of the exhaust gas passing through the SCR catalyst is made larger in accordance with the higher temperature of the SCR catalyst at the time of the NOx decreasing processing being carried out, the decrease in the amount of NOx reduction can be suppressed in a more reliable manner. As a result, the increase in the outflow NOx amount can be suppressed to be small more reliably. Here, note that when the space velocity (SV) becomes large to an excessive extent, NOx may pass or slip through the SCR catalyst, without reacting with ammonia, and hence, it is desirable to limit the space velocity (SV) so as not to be made excessively large.

Here, as a method of making large the space velocity (SV) of the exhaust gas passing through the SCR catalyst, there can be used a method in which the degree of opening of the throttle valve 4 is increased so as to increase the amount of intake air, thereby increasing the amount of exhaust gas passing through the SCR catalyst per unit time. In addition, in an arrangement in which a turbine of a variable capacity type turbocharger is arranged in the exhaust passage 3, there can also be used a method of changing the capacity of the turbocharger so as to increase the rotational speed of the turbine. Moreover, there can also be used a method in which the amount of EGR gas to be recirculated by an EGR device is decreased so as to increase the amount of intake air, thereby increasing the amount of exhaust gas passing through the SCR catalyst per unit time.

Here, note that the processing of making large the space velocity (SV) of the exhaust gas passing through the SCR catalyst can also be combined with the NOx decreasing processing of the above-mentioned second and/or third embodiment. In that case, when the inflow NOx concentration is larger than the upper limit value, and/or when the inflow NOx concentration is smaller than the lower limit value, the outflow NOx amount can be made small in a more reliable manner by increasing the space velocity (SV) of the exhaust gas passing through the SCR catalyst.

Fifth Embodiment

Furthermore, reference will be made to a fifth embodiment of the present invention based on FIG. 20. Here, a construction different from that of the above-mentioned first embodiment will be described, and an explanation of the same construction will be omitted.

The difference of this fourth embodiment from the above-mentioned first embodiment is that when the NOx decreasing processing is carried out, the oxygen concentration of the exhaust gas flowing into the SCR catalyst is made lower, as the temperature of the SCR catalyst becomes higher.

The above-mentioned second reaction (i.e., the reaction of $NH_3$ and oxygen) tends to be more remarkable in accordance with the higher temperature of the SCR catalyst. On the other hand, as shown in FIG. 20, when the oxygen concentration of the exhaust gas flowing into the SCR catalyst is made smaller in accordance with the higher temperature of the SCR catalyst at the time of the NOx decreasing processing being carried out, the amount of ammonia in contact (reaction) with oxygen can be decreased in a more reliable manner. As a result, the amount of NOx produced by the above-mentioned second reaction can be decreased more reliably. Accordingly, the increase in the amount of NOx flowing out from the SCR catalyst can be made small in a more reliable manner.

Here, note that as a method of making small the oxygen concentration of the exhaust gas flowing into the SCR catalyst, there can be used a method of adjusting the amount of intake air or the amount of fuel injection, so as to make the air fuel ratio of a mixture low (i.e., to be at a rich side).

Here, note that the processing of making small the oxygen concentration of the exhaust gas flowing into the SCR catalyst can be combined with at least one of the NOx decreasing processings of the above-mentioned second through fourth embodiments. In that case, when the temperature of the SCR catalyst is higher than the predetermined temperature, or when the inflow NOx concentration is smaller than the lower limit value, or when the inflow NOx concentration is larger than the upper limit value, it becomes possible to suppress the outflow NOx amount to be small in a more reliable manner by making small the oxygen concentration of the exhaust gas flowing into the SCR catalyst.

Other Embodiments

In the above-mentioned first through fifth embodiments, reference has been made to an example in which the particulate filter and the SCR catalyst are received in the different catalyst casings, respectively, but the particulate filter and the SCR catalyst may be received in the same catalyst casing. Specifically, the SCR catalyst may be carried or supported by the particulate filter. In that case, at the time when processing to oxidize and remove the PM trapped in the particulate filter (PM regeneration processing) is carried out, in addition to at the time when the internal combustion engine 1 is operated at a high load, the temperature of the SCR catalyst may become higher than the predetermined temperature Te0. In addition, in the arrangement in which the SCR catalyst is supported by the particulate filter, an exhaust gas path from the internal combustion engine 1 to the SCR catalyst becomes short, so that the opportunity for the temperature of the SCR catalyst to exceed the predetermined temperature Te0 may increase.

Accordingly, in the arrangement of the SCRF in which the SCR catalyst is supported by the particulate filter, when the NOx decreasing processing described in the above-mentioned first through fifth embodiments is carried out, in the case where the internal combustion engine 1 is operated at a high load, or in the case where the PM regeneration processing is carried out, etc., it is possible to suppress an increase in the amount of NOx flowing out from the SCRF to be small.

REFERENCE SIGNS LIST 1 internal combustion engine
1a fuel injection valves
2 intake passage
3 exhaust passage
4 throttle valve
5 first catalyst casing
6 second catalyst casing
7 addition valve
8 first exhaust gas temperature sensor
9 second exhaust gas temperature sensor
10 ECU
15 NOx sensor
70 pump
71 tank
100 EGR passage
101 EGR valve

The invention claimed is:

1. An exhaust gas purification apparatus for an internal combustion engine comprising:
   a selective catalytic reduction (SCR) catalyst that is arranged in an exhaust passage of the internal combustion engine, and selectively reduces $NO_x$ in an exhaust gas by using ammonia as a reducing agent;
   a supply device configured to add an additive agent, which is ammonia or a precursor of ammonia, to the exhaust gas at an upstream side of the SCR catalyst;
   a temperature detection device configured to detect a temperature of the SCR catalyst;
   a controller, comprising at least one processor, programmed, when the temperature detected by the temperature detection device is higher than a predetermined temperature at which $NO_x$ reduction rate of the SCR catalyst becomes a maximum, to increase an inflow $NO_x$ concentration which is a $NO_x$ concentration of the exhaust gas flowing into the SCR catalyst and increase an amount of addition of the additive agent in such a manner that an equivalent ratio, which is a ratio of an amount of ammonia with respect to an amount of $NO_x$ contained in the exhaust gas flowing into the SCR catalyst, becomes large, as compared to when the temperature detected by the temperature detection device is equal to or less than the predetermined temperature; and
   a $NO_x$ concentration detection device configured to detect the inflow $NO_x$ concentration,
   wherein the controller is further programmed, when the temperature detected by the temperature detection device is higher than the predetermined temperature and the inflow $NO_x$ concentration detected by the $NO_x$ concentration detection device at the time of the inflow $NO_x$ concentration being not increased is smaller than a lower limit value which is a minimum inflow $NO_x$ concentration at which an amount of $NO_x$ flowing out from the SCR catalyst can be decreased by increasing the inflow $NO_x$ concentration and the amount of addition of the additive agent, not to increase the inflow $NO_x$ concentration and to stop the addition of the additive agent by means of the supply device.

2. The exhaust gas purification apparatus for an internal combustion engine as set forth in claim 1, wherein
   the controller is programmed, when the temperature detected by the temperature detection device is higher than the predetermined temperature, to make the inflow $NO_x$ concentration larger and make the amount of addition of the additive agent larger in order for the equivalent ratio to become large, as the temperature detected by the temperature detection device becomes higher.

3. The exhaust gas purification apparatus for an internal combustion engine as set forth in claim 1, wherein
   the controller is programmed, in cases where the temperature detected by the temperature detection device is higher than the predetermined temperature, to set the lower limit value to be larger as the temperature of the SCR catalyst becomes higher.

4. The exhaust gas purification apparatus for an internal combustion engine as set forth in claim 1,
   wherein the controller is programmed, when the temperature detected by the temperature detection device is higher than the predetermined temperature and the inflow $NO_x$ concentration detected by the $NO_x$ concentration detection device at the time of the inflow $NO_x$ concentration being not increased is larger than an upper limit value which is a maximum inflow $NO_x$ concentration at which the amount of ammonia to be oxidized in the SCR catalyst can be decreased by increasing the inflow $NO_x$ concentration, not to increase the inflow $NO_x$ concentration, but to increase the amount of addition of the additive agent.

5. The exhaust gas purification apparatus for an internal combustion engine as set forth in claim 4, wherein
   the controller is programmed, in cases where the temperature detected by the temperature detection device is higher than the predetermined temperature, to set the upper limit value to be larger as the temperature of the SCR catalyst becomes higher.

6. The exhaust gas purification apparatus for an internal combustion engine as set forth in claim 1, wherein
   the controller is programmed, when the temperature detected by the temperature detection device is higher than the predetermined temperature, to obtain, based on a relation between the inflow $NO_x$ concentration, the equivalent ratio and the amount of $NO_x$ flowing out from the SCR catalyst, a minimum equivalent ratio at which an amount of $NO_x$ flowing out from the SCR catalyst when the inflow $NO_x$ concentration is increased becomes equal to or less than an allowable amount, and increase the amount of addition of the additive agent according to the minimum equivalent ratio.

7. The exhaust gas purification apparatus for an internal combustion engine as set forth in claim 1, wherein
   the controller is programmed, in cases where the temperature detected by the temperature detection device is higher than the predetermined temperature, to make an oxygen concentration of the exhaust gas flowing into the SCR catalyst smaller as the temperature detected by the temperature detection device becomes higher.

8. The exhaust gas purification apparatus for an internal combustion engine as set forth in claim 1, wherein
   the controller is programmed, in cases where the temperature detected by the temperature detection device is higher than the predetermined temperature, to make a space velocity of the exhaust gas passing through the SCR catalyst larger as the temperature detected by the temperature detection device becomes higher.

* * * * *